United States Patent [19]
Fukui et al.

[11] Patent Number: 5,980,054
[45] Date of Patent: Nov. 9, 1999

[54] PANEL-FORM ILLUMINATING SYSTEM

[75] Inventors: Atsushi Fukui; Kanji Nishii; Kenji Takamoto; Masami Ito; Kazumasa Takata; Ken Tatsuta; Koki Nakabayashi, all of Osaka; Hiroshi Watanabe, Kyoto, all of Japan

[73] Assignee: Matsushita Electric Industrial Co., Ltd., Osaka, Japan

[21] Appl. No.: 08/839,232

[22] Filed: Apr. 24, 1997

[30] Foreign Application Priority Data

May 9, 1996 [JP] Japan .................................. 8-114537

[51] Int. Cl.$^6$ .................................................. F21V 07/04
[52] U.S. Cl. ............................... 362/31; 362/19; 362/309
[58] Field of Search ............................. 362/31, 308, 327, 362/330, 339, 309, 19

[56] References Cited

U.S. PATENT DOCUMENTS

| 4,914,553 | 4/1990 | Hamada | 362/32 |
| 5,584,556 | 12/1996 | Yokoyama | 362/31 |

FOREIGN PATENT DOCUMENTS

| 5-127159 | 5/1993 | Japan . |
| 5-150237 | 6/1993 | Japan . |
| 7-294745 | 11/1995 | Japan . |

*Primary Examiner*—Sandra O'Shea
*Assistant Examiner*—Marshall Honeyman
*Attorney, Agent, or Firm*—Merchant & Gould P.C.

[57] ABSTRACT

An efficient, luminous and energy-saving panel-form illuminating system suitable for mass-production, comprising at least a photoconductor, a linear light source at one side of the photoconductor, and a reflector; wherein grooves or protrusions are formed on the bottom surface of the photoconductor.

13 Claims, 34 Drawing Sheets

PANEL-FORM ILLUMINATING SYSTEM

FIELD OF THE INVENTION

The present invention relates to a panel-form illuminating system applied for the back lighting of liquid crystal displays or the like.

BACKGROUND OF THE INVENTION

Liquid crystal displays have been widely applied as display devices for personal computers, portable terminals and the like. Further improvement in luminance and energy-saving properties has been sought for panel-form illuminating system as the back lighting of display devices.

One embodiment of a conventional panel-form illuminating system is explained by referring to FIG. 34 (see Laid-open (Kokai) Japanese Patent Application No. Hei 5-127159.).

FIG. 34 is a cross-sectional view of the conventional panel-form illuminating system. As shown in the figure, the conventional panel-form illuminating system consists of a flat-panel photoconductor 131, a linear light source 134 parallel to the side of photoconductor 131, a reflector 135 covering linear light source 134, a light diffusing material 136 applied on the back side of photoconductor 131 in a spot pattern, a reflective sheet 133 applied below the back side of photoconductor 131, a light diffusing sheet 132 applied above the front side of photoconductor 131, and a prism sheet 137 applied above light diffusing sheet 132.

In this conventional panel-form illuminating system, light is irradiated from the side of photoconductor 131 by linear light source 134. The light transmitting inside photoconductor 131 by total reflection is diffused by light diffusing material 136 on the back surface of photoconductor 131. Due to light diffusion, the conditions of total reflection deteriorate, and the light emits to the outside of photoconductor 131. The light emitting from photoconductor 131 is reflected by reflective sheet 133 formed on the back surface of photoconductor 131, thus emitting the light from the front surface of photoconductor 131. Since the light emits in an inclined direction from the front surface of photoconductor 131, the light is refracted to the front surface direction by prism sheet 137. Due to the application of light diffusing sheet 132 above the front surface of photoconductor 131, the pattern of light diffusing material 136 on the back surface of photoconductor 131 cannot be observed from the front surface of photoconductor 131.

In the above-described conventional panel-form illuminating system, however, multiple reflection occurs between prism sheet 137 and reflective sheet 133. Thus, light absorption at light diffusing material 136, light diffusing sheet 132 and reflective sheet 133 becomes large, so that optical efficiency as a panel-form illuminating system declines. Furthermore, with the application of a plurality of sheets (reflective sheet 133, light diffusing sheet 132 and prism sheet 137), each sheet is likely to deviate from the correct position and dust can enter between sheets, thereby further reducing quality.

SUMMARY OF THE INVENTION

In order to solve the conventional problems mentioned above, the present invention seeks to provide a highly efficient, luminous and energy-saving panel-form illuminating system which is excellent for mass-production.

The above-noted object is achieved by a first panel-form illuminating system of the present invention which comprises a photoconductor and a light source placed at the side of the photoconductor, wherein incident light from the light source to the photoconductor emits from the top surface of the photoconductor. A plurality of grooves are formed on the bottom surface of the photoconductor at a distance, and have an inclined surface facing the light source. Therefore, total reflection is carried out twice at the flat sections of the bottom surface of the photoconductor and at the inclined surfaces of the grooves, so that the system requires no prism sheet and light diffusing material on the bottom surface of the photoconductor. In other words, there is no light absorption at the prism sheet and the light diffusion material, thus improving optical efficiency, luminance and energy-saving properties. Also, since the number of sheets is reduced and the step of applying a light diffusing material on the bottom surface of a photoconductor is omitted, the construction and mass-production of the system becomes extremely efficient.

In the first panel-form illuminating system of the present invention, it is preferable that the photoconductor has a wedge-shape cross-section. Thus, the weight of the photoconductor is minimized, and light efficiently emits from the photoconductor since the light reflected by the side of the photoconductor (which is opposite to the side facing the light source) does not return to the light source.

It is also preferable that the groove has a width smaller than a gap between the grooves. Therefore, transmitting light inside the photoconductor is totally reflected by the sections of the photoconductor where no grooves are formed and by the inclined surfaces of the grooves. Also, light emits from the photoconductor nearly in a perpendicular direction to the top surface of the photoconductor, so that the application of a prism sheet becomes unnecessary. As a result, the decline in the quantity of light due to multiple reflection inside a prism sheet is prevented. The application of a light diffusing material on the bottom of the photoconductor so as to emit light from a photoconductor is also not required, thus preventing light absorption at the light diffusing material. In other words, a panel-form illuminating system with high luminance is provided.

It is further preferable that the groove has one of a trapezoidal and triangular cross-section.

It is preferable that the inclined surface of the groove facing the light source has an angle which is expressed by the following Formula 2;

$$\phi_1 = 53° - \sin^{-1}\{(1/n)\sin\alpha\} \quad \text{[Formula 2]}$$

wherein n represents the refractive index of the photoconductor; and α represents the central angle of a radiance distribution. Thus, the center of the radiance distribution can be shifted toward a predetermined direction (α).

It is also preferable that each groove consists of a plurality of adjoining smaller grooves, thus further improving luminance.

It is further preferable that the photoconductor has a tier-shaped bottom surface, and that at least one groove is formed at each step.

It is preferable that the inclined surface is curved. Therefore, the radiance distribution of the light emitting from the photoconductor is widened, so that the system can be adopted to liquid crystal displays with wide angle visibility.

It is also preferable that the inclined surface is roughened. Thus, reflected light is diffused, and the radiance distribution of the light emitting from the photoconductor is widened. In other words, the system can be adopted to liquid crystal displays with wide angle visibility.

It is preferable that a polarizer and a polarization converting plate for rotating a polarizing direction are applied above and below the photoconductor respectively. Thus, light absorption at the polarizer of a liquid crystal display on the side of incidence is prevented, and optical efficiency is nearly doubled. As a result, the luminance and energy-saving properties of the system are improved to a great extent. Furthermore, it is preferable that the polarization converting plate formed with grooves having a triangular cross-section and an about 90° apex angle is arranged so as to set the direction of the grooves at 45° relative to the transmission axis of the polarizer. Thus, the polarization direction of incident light to the polarization converting plate can be rotated.

It is also preferable that a polarizer and a phase-contrast plate having a quarter-wavelength phase difference are applied above and below the photoconductor respectively so as to set the optical axis of the phase-contrast plate at 45° relative to the transmission axis of the polarizer. Thus, by rotating the polarization direction of incident light to the phase-contrast plate, light absorption at the polarizer of a liquid crystal display on the side of incidence is prevented. As a result, optical efficiency is almost doubled, and luminance and energy-saving properties are also enhanced.

It is further preferable that a light diffusing plate and a reflecter are applied above and below the photoconductor respectively, so that light emitting from the bottom of the photoconductor is reflected and then reenters the photoconductor, and luminescent lines cased by the grooves are prevented by diffusing the light emitting from the top surface of the photoconductor by the light diffusing plate.

A second panel-form illuminating system of the present invention comprises a photoconductor and a light source placed at the side of the photoconductor, wherein incident light to the photoconductor from the light source emits from the top surface of the photoconductor. Linear protrusions are formed on the bottom surface of the photoconductor at predetermined intervals, and have inclined surfaces facing the light source. Thus, due to total reflection at the inclined surfaces of the linear protrusions, light emits from the top surface of the photoconductor. In other words, no prism sheet and light diffusing material on the bottom surface of the photoconductor is required, so that light is not absorbed by the prism sheet and the light diffusing material. Thus, the system has improved optical efficiency, luminance and energy-saving properties. Furthermore, the number of sheets is reduced and the step of forming a light diffusing material on the bottom surface of the photoconductor is omitted, so that the construction and mass-production of the system becomes more efficient.

It is preferable that the photoconductor has a wedge-form cross-section.

It is also preferable that the photoconductor has a tier-shaped bottom surface and that linear protrusions are formed at each level.

It is preferable that a polarizer and a polarization converting plate for rotating a polarizing direction are applied above and below the photoconductor respectively. It is further preferable that the polarization converting plate is formed with grooves having a triangular cross-section and an about 90° apex angle, and that the plate is arranged so as to set the direction of the grooves at about 45° relative to the transmission axis of the polarizer.

It is also preferable that a polarizer and a phase-contrast plate having a quarter-wavelength phase difference are applied above and below the photoconductor respectively, and that the phase-contrast plate is arranged so as to set the direction of its optical axis at 45° relative to the transmission axis of the polarizer.

It is further preferable that a light diffusing plate and a reflective plate are applied above and below the photoconductor respectively.

DETAILED DESCRIPTION OF THE INVENTION

The present invention is explained in further detail by referring to the following examples.

EXAMPLE 1

Figure 1:
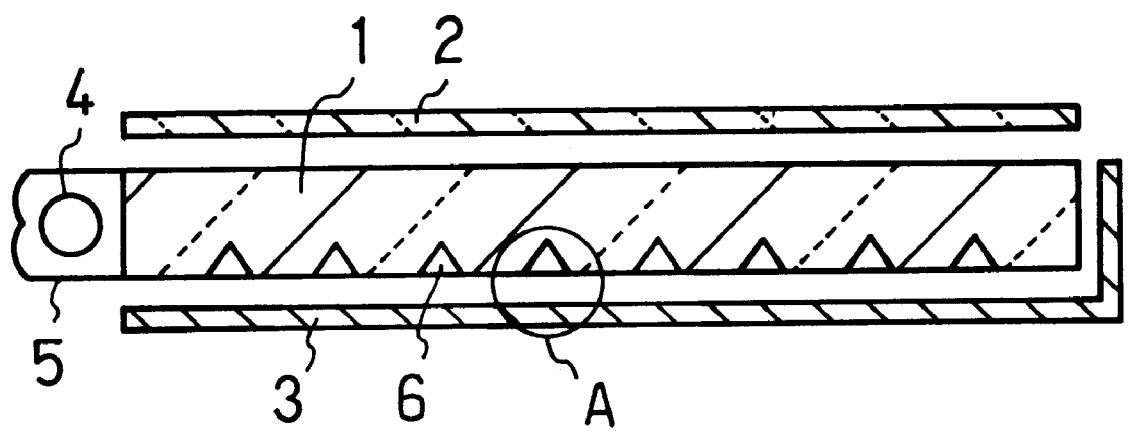
FIG. 1 is a cross-sectional view of a panel-form illuminating system of a first embodiment of the present invention.

FIG. 1 is a cross-sectional view of a panel-form illuminating system of a first embodiment of the present invention. In FIG. 1, 1 indicates a photoconductor, and is made of quartz, glass, transparent resin (such as acrylic resin and polycarbonate) or the like. The top and bottom surfaces of photoconductor 1 are parallel to each other, and photoconductor 1 has a rectangular shape when it is seen from the top surface. The side surfaces are perpendicular to the top and bottom surfaces of photoconductor 1. On the bottom surface of photoconductor 1, a plurality of grooves 6 are formed. Reference number 2 indicates a light diffusing plate, which is placed above photoconductor 1. Light diffusing plate 2 is made of a transparent resin sheet or the like in which materials of various refraction indexes are dispersed, a transparent sheet on which transparent particles are dispersed, or a transparent sheet having a roughened surface. Reference number 3 indicates a reflective plate. The reflective plate 3 is placed covering the bottom surface and a side surface of photoconductor 1, which is opposite to the side that is adjacent to a linear light source 4. Reflective plate 3 is formed, for example, by densely dispersing air bubbles of about several to several dozen $\mu$m inside a transparent resin sheet or by depositing a material having a high reflectance such as silver and aluminum onto a resin sheet, a metal plate or the like, so that the plate has a higher reflectance at least at the surface facing photoconductor 1. Reference number 4 indicates a linear light source, and this is positioned near one side of photoconductor 1. For linear light source 4, hot cathode tubes, fluorescent lights such as cold cathodes, or light emitting diodes may be arranged in lines, or incandescent lamps or organic luminescent materials may be formed in a linear pattern. Reference number 5 indicates a reflector, which is positioned so as to cover linear light source 4. The inner surface of reflector 5 has a high reflectance and small diffusing properties. Reflector 5 is prepared by depositing a material of a high reflectance such as silver and aluminum onto a resin sheet, and by adhering the sheet to a thin metal plate or a thin resin sheet.

Figure 2:
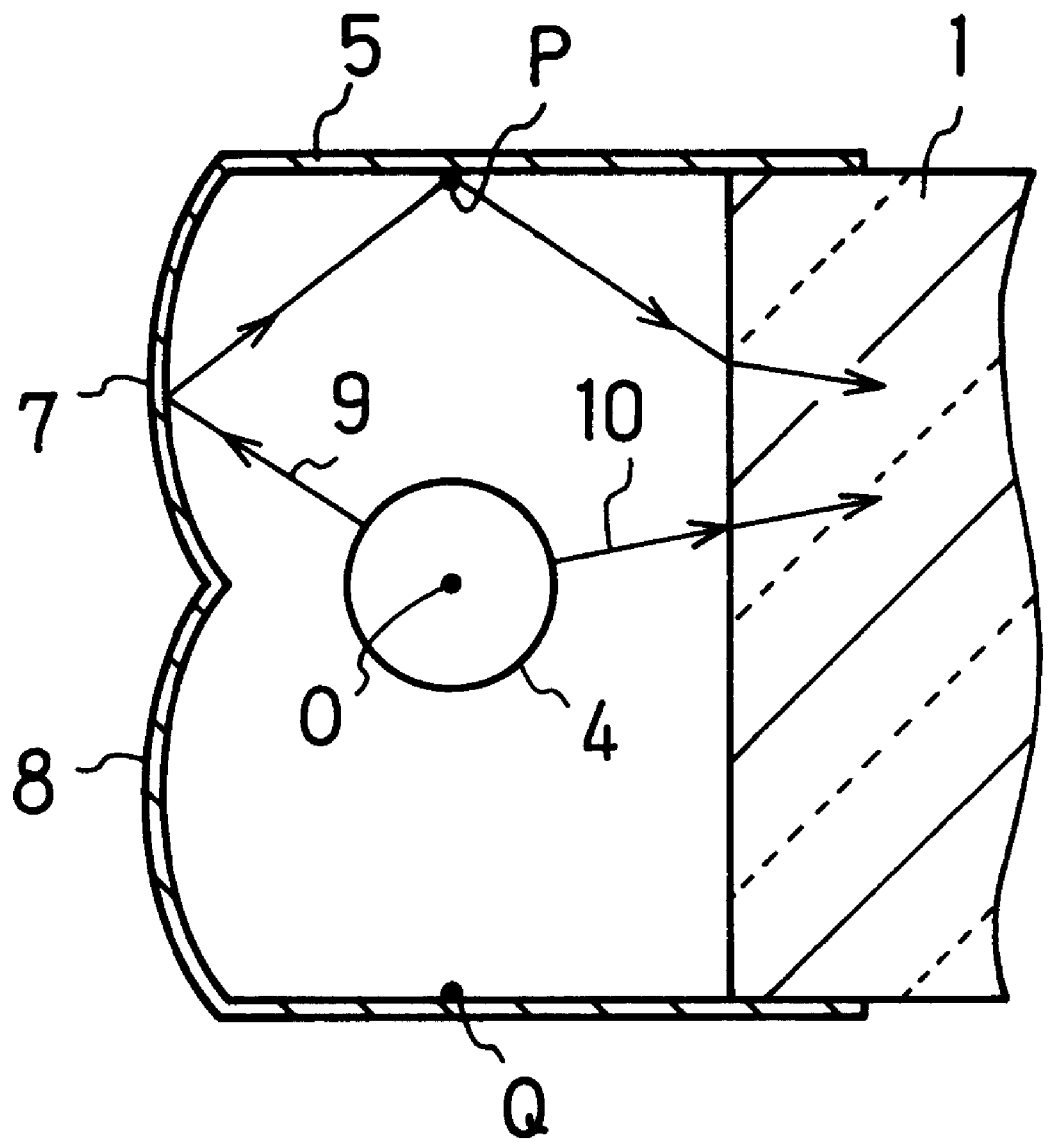
FIG. 2 is a cross-sectional view of a reflector of the panel-form illuminating system of the first embodiment of the present invention.

FIG. 2 shows a cross-sectional view of the reflector of this embodiment. In FIG. 2, sections 7 and 8 are a part of reflector 5, and have elliptical cross-sections (hereinafter referred to as "elliptical section 7" and "elliptical section 8"). One focal point of elliptical section 7 is a center point O of linear light source 4; and another is a point P between linear light source 4 and the top surface of reflector 5. Similarly, one focal point of elliptical section 8 is the center point O; and another is a point Q between linear light source 4 and the bottom surface of reflector 5. The radius vectors of elliptical sections 7 and 8 are preferably small. When linear light source 4 is a fluorescent light, the gap between linear light source 4 and reflector 5 should be filled with a transparent material having a refraction index close to 1.5 of a glass refraction index.

The thickness of the side of photoconductor 1 facing linear light source 4 is preferably the same as the height of reflector 5. The size (diameter) of linear light source 4 is preferably less than 80%, more preferably less than 70% of the height of reflector 5. Thus, a gap between linear light source 4 and reflector 5 is provided, and the light emitting from the back side of linear light source 4 is efficiently directed to photoconductor 1.

Figure 3:
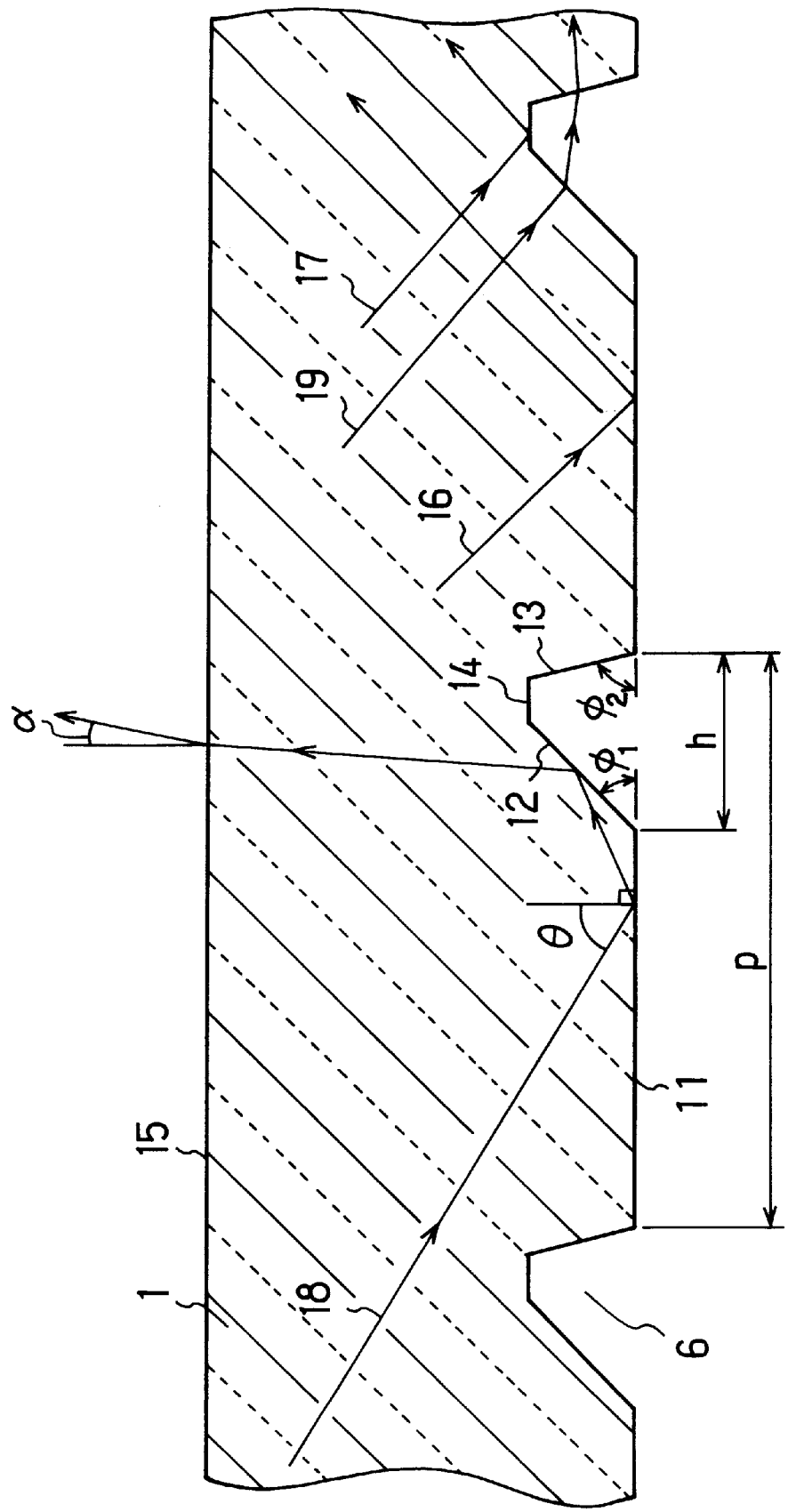
FIG. 3 is a cross-sectional view of a photoconductor (section A in FIG. 1) of the panel-form illuminating system of the first embodiment of the present invention.

FIG. 3 shows a cross-section (section A of FIG. 1) of the photoconductor of the panel-form illuminating system shown in FIG. 1. In this figure, linear light source 4 is supposed to be positioned on the left side. As shown in the figure, the bottom surface of photoconductor 1 consists of flat sections 11 parallel to a top surface 15 of photoconductor 1, and a plurality of grooves 6 having trapezoidal cross-sections. Groove 6 has an inclined surface 12 facing linear light source 4, a surface 14 parallel to top surface 15 of photoconductor 1, and an inclined surface 13 on the side opposite to the side facing linear light source 4. In order to set the center of a radiance distribution of the light emitting from photoconductor 1 almost vertical to top surface 15 of photoconductor 1, inclined surface 12 of groove 6 is inclined by about 53° ($\phi_1$) In order to set the center within ±10° relative to the normal direction of top surface 15 of photoconductor 1, inclined surface 12 should be inclined by about 46°<$\phi_1$<about 60°. Furthermore, when the central angle of the radiance distribution is expressed as α, the center of the radiance distribution is shifted toward a predetermined a direction in FIG. 3 by setting angle ($\phi_1$) of inclined surface 12 as in the following formula 3:

$$\phi_1 = 53° - \sin^{-1}\{(1/n)\sin\alpha\} \qquad \text{[Formula 3]}$$

wherein n represents a refraction index of the photoconductor.

As the angle ($\phi_2$) of inclined surface 13 of groove 6 is closer to 90°, radiance from photoconductor 1 becomes strong. The inclined surface 13 is an incident part of the photoconductor 1. Therefore, the inclined surface 13 functions like the side of the photoconductor 1 facing linear light source 4. The incident light from the inclined surface 13 can be entirely reflected in the photoconductor 1 by setting the angle $\phi_2$ to be about 90° to the top surface 15 and the bottom surface. As a result, incident light irradiated from the photoconductor 1 can be prevented, and thus, luminance in the front direction (top surface 15 direction) will be enhanced. It is practical to set the angle ($\phi_2$) between 60° and 90°. In consideration of preparing photoconductor 1 by press molding, injection molding, roller molding or the like, it is preferable to form draft leaves of around 3°. Thus, the angle ($\phi_2$) should be around 87°, or more preferably smaller than 87°.

Figure 4A:
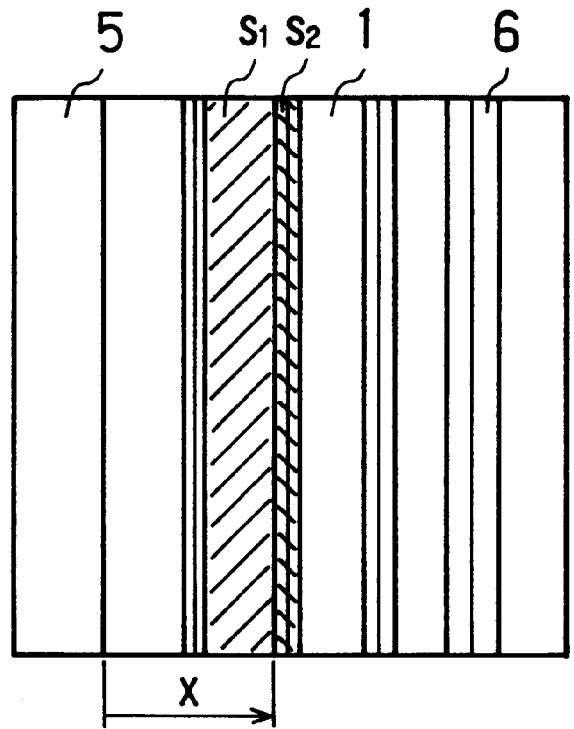
FIGS. 4(a) and (b) show a groove distribution of the panel-form illuminating system of the first embodiment of the present invention.
Figure 4B:
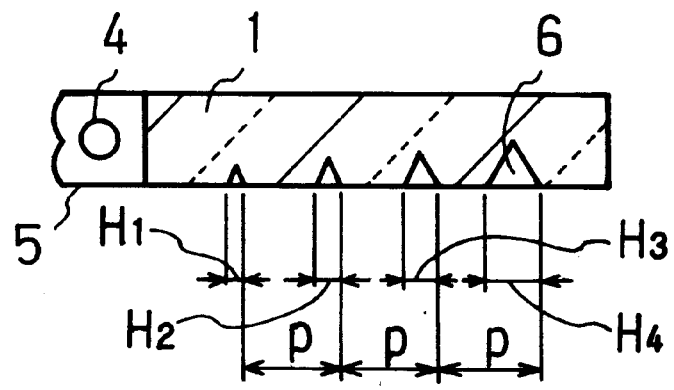

FIGS. 4(a) and 4(b) show the position of grooves (groove distribution) formed on the photoconductor of the panel-form illuminating system of this embodiment. The direction of grooves 6 is almost parallel to the longitudinal direction of linear light source 4. The pitch (p) of grooves 6 is uniform. The width (H) of grooves 6 becomes small as they are positioned closer to linear light source 4; and the width becomes large as they are farther apart from the light source.

A correlation shown in the following Formula 4 is found when a distance from the side of the photoconductor facing linear light source 4 is expressed as (x), the area ratio of groove 6 at a distance (x) is expressed as (S) $\{S=s_2/(s_1+s_2)$ where the areas of flat section 11 and that of groove 6 around distance x are $s_1$ and $s_2$ respectively$\}$, and the length of photoconductor 1 is expressed as (L):

$$S = \alpha \cdot \beta^{X/L} \qquad \text{[Formula 4]}$$

In this case, it is preferable that S is in the range of 0<S<½ and that β is in the range of 1.0<β<4.0. In order to provide a uniform luminance distribution of the light emitting from photoconductor 1, α should be around 0.04 while β should be around 3.0.

As the pitch (p) of grooves 6 becomes small, the grooves become less visible, thus improving display visibility. With a small pitch (p), light diffusing plate 2 having small diffusing properties can be applied, so that luminance in the direction of the front surface (top surface direction of photoconductor 1) is increased. According to an experiment, by setting the pitch (p) less than 1 mm, the groove lines became invisible. Thus, it is more preferable to set the pitch (p) less than 0.5 mm. Furthermore, if the pitch (p) is one third or less of the picture element pitch of a liquid crystal display, using light diffusing plate 2 becomes unnecessary.

In addition, the operations of the panel-form illuminating system mentioned above are explained below. As shown in FIG. 2, the incident light from linear light source 4 directly enters photoconductor 1 as a ray 10, or enters photoconductor 1 after being reflected by reflector 5 as a ray 9. A large portion of the light from the back side of line-shaped light source 4 (the side opposite to the side facing photoconductor 1) hits elliptical section 7 and elliptical section 8. One focal point of elliptical section 7 (8) is the central point O of linear light source 4; another focal point of elliptical section 7 (8) is a point P (Q) between linear light source 4 and the top surface (bottom surface) of reflector 5. By elliptical mirrors such as elliptical sections 7 and 8, light from one focal point converges onto another focal point. In other words, a large portion of the light emitted from the back side of linear light source 4 enters photoconductor 1 after being reflected by elliptical sections 7 and 8. In general, when linear light source 4 is a fluorescent light, about half the light reentering the fluorescent light is absorbed by the fluorescent substance of the light. However, in this example, light absorption by linear light source 4 is minimized. With a smaller radius vector of elliptical sections 7 and 8, the ratio of reflected light at elliptical sections 7 and 8 increases, thereby improving optical efficiency. In addition, when linear light source 4 is a fluorescent light, the fluorescent substance is applied inside the fluorescent light tube, so that the diameter of the light tube can be minimized by filling a gap between linear light source 4 and reflector 5 with a transparent material having a small refraction index which is close to the refraction index of the fluorescent light tube material. As a result, the gap between linear light source 4 and reflector 5 can be widened, thereby improving optical efficiency.

Light transmission inside photoconductor 1 will be explained by referring to FIG. 3.

When the refractive index of photoconductor 1 is (n), incident light to photoconductor 1 has a radiation distribution of ±$\sin^{-1}(1/n)$ in accordance with Snell's law. Since almost all the materials of photoconductor 1 have a 1.42 or higher refractive index (n), the radiation distribution is in the range of ±44.77°. The top and bottom surfaces of photoconductor 1 are perpendicular to each other, and the top and bottom surfaces are vertical to the side surface (incidence surface) of photoconductor 1. Thus, when incident light from the side of photoconductor 1 hits the top or bottom surface of photoconductor 1, the minimum angle of incidence (θ) is (90°−44.77°)=45.23°. With a 1.42 or above refractive index (n) of photoconductor 1, the total reflection angle is 44.7° or less, so that the incident light from the side of photoconductor 1 is totally reflected by the top or bottom surfaces of photoconductor 1. Among the rays transmitting inside photoconductor 1, the rays—which are totally reflected by flat sections 11 outside grooves 6 as a ray 16—transmit inside photoconductor 1 as they are repeatedly and totally reflected. Similarly, the rays, totally reflected by surface 14 as a ray 17, transmit inside the photoconductor while they are repeatedly and totally reflected. As a ray 18, the rays—which are totally reflected by flat sections 11 near grooves 6 and by inclined surfaces 12—change the optical path to a large extent and then enter top surface 15 of photoconductor 1. Since the optical path changes entirely by two total reflections, the angle of incidence becomes smaller than the total reflection angle and a large section of rays exit photoconductor 1. A large portion of the rays directly enter inclined surfaces 12 of grooves 6 as a ray 19 transmits inclined surface 12. The ray then reenters photoconductor 1 after refracting at inclined surfaces 12 and 13, and transmits inside photoconductor 1 as it is repeatedly and totally reflected. In addition, a portion of the rays transmitting through inclined surfaces 12 is reflected by reflective plate 3 (shown in FIG. 1), and reenters photoconductor 1. As described above, among the rays transmitting inside photoconductor 1, the rays totally reflected two times by flat sections 11 and inclined surfaces 12 exit photoconductor 1 from top surface 15.

Figure 5:
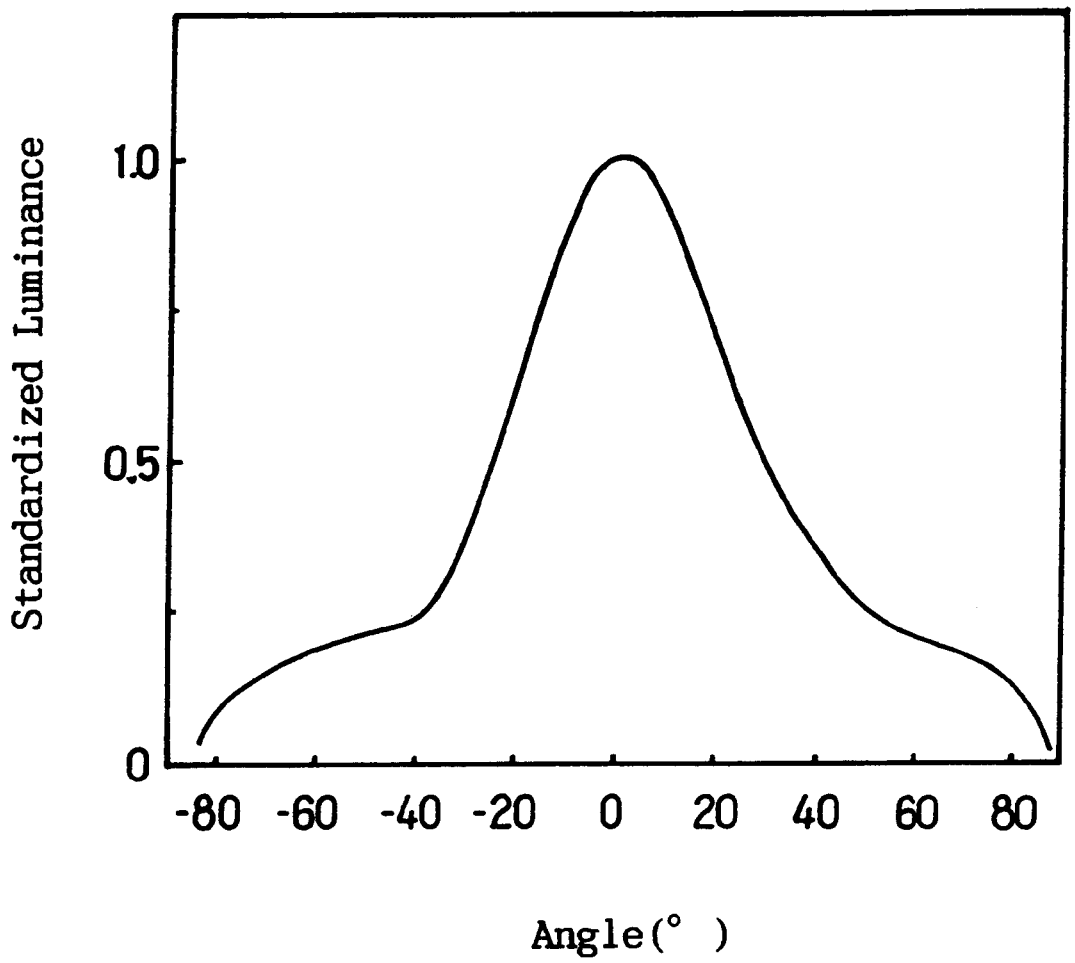
FIG. 5 shows a radiance distribution of light emitting from the photoconductor of the panel-form illuminating system of the first embodiment of the present invention.

FIG. 5 shows a radiance distribution of the light emitting from photoconductor 1, found by ray tracing. The horizontal axis in FIG. 5 indicates the radiance distribution of FIG. 1, and the negative direction indicates the side of linear light source 4. The vertical axis in FIG. 5 indicates a standardized luminance. For the radiance distribution shown in FIG. 5, the angle ($\phi_1$) of inclined surface 12 facing linear light source 4 is 53°, and the angle ($\phi_2$) of inclined surface 13 opposite to inclined surface 12 is 87°. In this case, it is found that the center of the radiance distribution is almost perpendicular to top surface 15. Since the optical path of the light emitting from the top surface 15 of photoconductor 1 is changed by the total reflection at inclined surface 12, the central angle ($\alpha$) of the radiance distribution can be controlled by changing the angle ($\phi_1$) of inclined surface 12.

Based on Snell's law, a correlation as shown in the following Formula 5 is found, so that $\alpha$ and $\phi_1$ can be expressed as in the following Formula 6 and Formula 7 respectively:

$$n \cdot \sin(53° - \phi_1) = \sin \alpha \qquad \text{[Formula 5]}$$

wherein n represents a refractive index of the photoconductor;

$$\alpha = \sin^{-1}\{n \cdot \sin(53° - \phi_1)\}; \qquad \text{[Formula 6]}$$

and $$\phi = 53° - \sin^{-1}\{(1/n) \sin \alpha\}. \qquad \text{[Formula 7]}$$

For example, if photoconductor 1 is made of acrylic and has a 1.49 refractive index (n), the angle of inclined surface 12 ($\phi_1$) can be in the range of 46°<$\phi_1$<60° so as to set the central angle ($\alpha$) of the radiance distribution in the range of ±10°.

The quantity of light in photoconductor 1 is larger as a section of the photoconductor is closer to linear light source 4; and the quantity becomes small as a section of the photoconductor is farther apart from the light source. Thus, as shown in FIGS. 4(a) and 4(b), the width (H) of grooves 6 relative to flat section 11 can be gradually minimized as the grooves come closer to linear light source 4; and the width (H) can be gradually widened as the grooves become apart from the light source, so that the panel-form illuminating system has little unevenness in the quantity of the light emitted from top surface 15 of photoconductor 1.

The light emitted from top surface 15 of photoconductor 1 enters light diffusing plate 2 (shown in FIG. 1), and is then diffused. Due to this diffusion, luminescent lines caused by grooves 6 can be prevented.

As described above, in this example, linear light source 4 is placed at the side of flat-plate type photoconductor 1, and a plurality of grooves 6 having a trapezoid cross-section are formed almost in parallel to linear light source 4 on the bottom surface of photoconductor 1; wherein light emits from top surface 15 ofphotoconductor 1 after two total reflections at flat sections 11 and inclined surfaces 12. Thus, no light diffusing material is necessary on the bottom surface of photoconductor 1, and there is no light absorption at a prism sheet and a light diffusing material, thus improving optical efficienty, luminance and energy-saving properties. Furthermore, the number of sheets is reduced and the step of forming a light diffusing material on the bottom surface of photoconductor 1 is omitted. In other words, the construction and mass-production of the panel-form illuminating system becomes more efficient.

Figure 6:
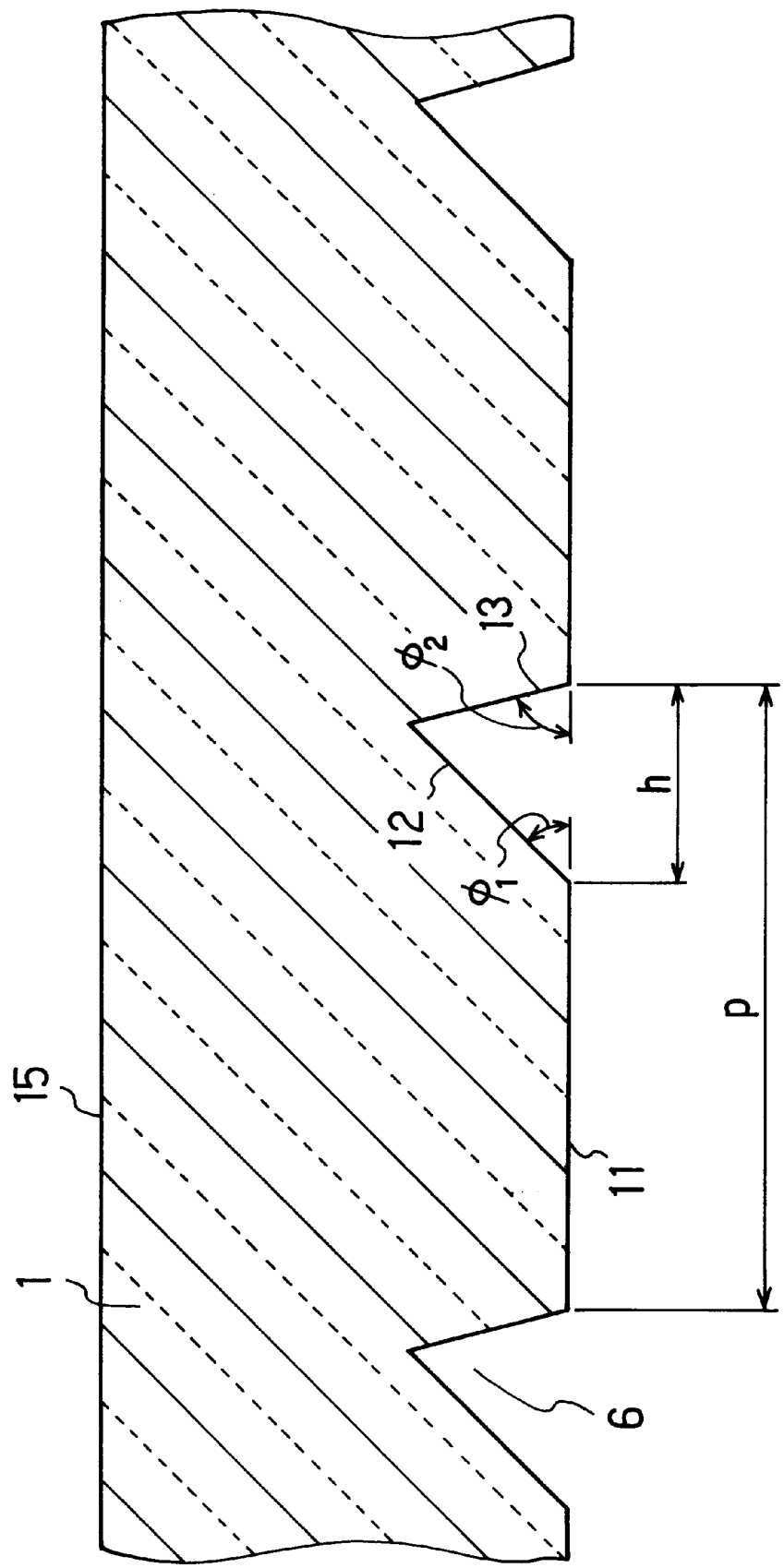
FIG. 6 is a cross-sectional view of another photoconductor of the panel-form illuminating system of the first embodiment of the present invention.

In this example, the cross-section of groove 6 has a trapezoid shape, but is not limited to this shape. As shown in FIG. 6, the cross-section of groove 6 may be triangular.

EXAMPLE 2

Figure 7:
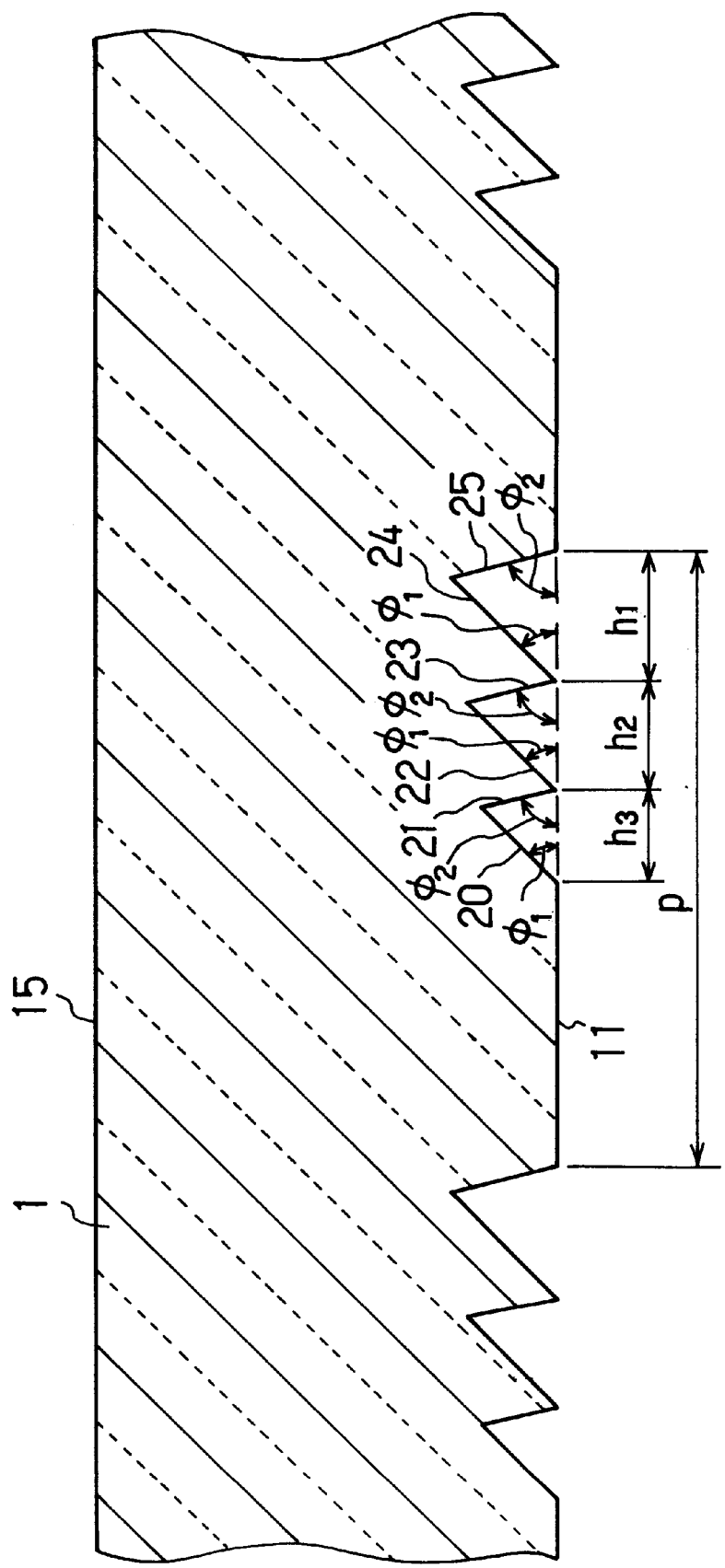
FIG. 7 is a cross-sectional view of a photoconductor of a panel-form illuminating system of a second embodiment of the present invention.

FIG. 7 is a cross-sectional view of a photoconductor of a panel-form illuminating system of a second embodiment of the present invention. This panel-form illuminating system basically has the same structure as in Example 1, except for the shape of grooves formed on the bottom surface of a photoconductor 1. In FIG. 7, a linear light source 4 is positioned on the left side.

As shown in FIG. 7, the bottom surface of photoconductor 1 comprises a flat section 11 almost parallel to a top surface 15 of photoconductor 1, a third groove, a second groove and a first groove. The third groove has an inclined surface 20 facing a linear light source 4 and an inclined surface 21 opposite to inclined surface 20; similarly, the second groove has inclined surfaces 22 and 23; and the first groove has inclined surfaces 24 and 25. The cross-section of each groove has a triangular shape. The angles ($\phi_1$) of inclined surfaces 20, 22 and 24 are almost the same while the angles ($\phi_2$) of inclined surfaces 21, 23 and 25 are the same. In other words, these grooves have the same shapes. In order to set the center of a radiance distribution of the light emitting from photoconductor 1 almost parallel to top surface 15 of photoconductor 1, the angles ($\phi_1$) of inclined surfaces 20, 22 and 24 should be about 50°. Also, in order to set the center of the radiance distribution within ±10° relative to the normal direction of top surface 15, the angle ($\phi_1$) should be in the range of about 43°<$\phi_1$<around 57°. Furthermore, in order to direct the center of the radiance distribution in a predetermined direction ($\alpha$) in FIG. 7 (where the central angle of the distribution is $\alpha$), the angle ($\phi_1$) should be set as in the following Formula 8:

$$\phi_1 = 50° - \sin^{-1}\{(1/n) \sin \alpha\} \qquad \text{[Formula 8]}$$

wherein n represents a refractive index of the photoconductor.

As the angle ($\phi_2$) of inclined surfaces 21, 23 and 25 becomes closer to 90°, radiance from photoconductor 1 increases. It is practical to set the angle ($\phi_2$) in the range of 60°<$\phi_2$<90. In consideration of preparing photoconductor 1 by press molding, injection molding, roller molding or the like, it is preferable to set the draft leaves at around 3°. Therefore, the angle ($\phi_2$) should be around 87° or smaller.

When the widths of first, second and third grooves are h1, h2 and h3 respectively, it is preferable that h1>h2>h3. In other words, it is preferable that the width gets smaller as the groove is closer to linear light source 4. For instance, when a ratio of the width of the "n-th" groove relative to that of the first groove is hn, hn should be equal to $\gamma^{n-1}$. In this case, $\gamma$ is preferably in the range of 0.5–1.0, or more preferably around 0.8.

The operations of the above-described panel-form illuminating system will be described below. Among the rays transmitting inside photoconductor 1, the rays—that hit flat section 11 outside the grooves—transmit inside photoconductor 1 as they are repeatedly and totally reflected inside the photoconductor. The incident light to flat section 11 near the third groove is totally reflected by the section, and is then totally reflected on inclined surface 20. As a result, the light enters top surface 15 after its optical path is changed to a large extent. A large portion of the rays entering top surface 15 as described above have an angle of incidence smaller than the total reflection angle at top surface 15, thus exiting photoconductor 1 from top surface 15. Also, a large portion of the direct incident rays to inclined surface 20 transmits through inclined surface 20. Most of the rays then reenter photoconductor 1 through inclined surface 21; the rest of the rays are reflected by reflective plate 3 (shown in FIG. 1) and reenter photoconductor 1. A portion of the rays which reentered photoconductor 1 through inclined surface 21 is totally reflected by inclined surface 22 of the second groove, and exits to the outside of photoconductor 1 through top surface 15; the rest of the rays transmit through inclined surface 22, reenter photoconductor 1 through inclined surface 23, and then exit through top surface 15 of photoconductor 1 after being totally reflected by inclined surface 24. Similarly, the above description can be applied to the direct incident rays to inclined surfaces 22 and 24 of the second and first grooves.

Figure 8:
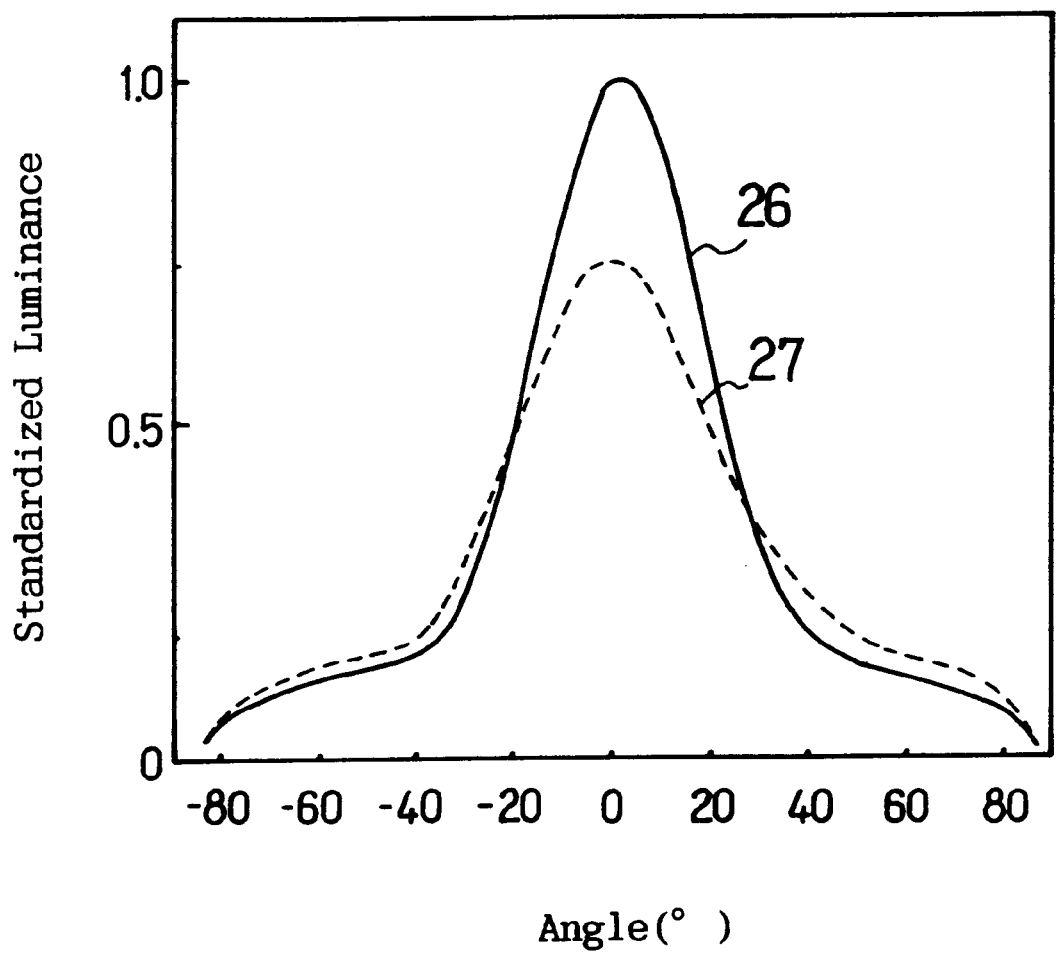
FIG. 8 shows a radiance distribution of the light emitting from the photoconductor of the panel-form illuminating system of the second embodiment of the present invention.

FIG. 8 shows the radiance distribution of light emitting from photoconductor 1, found by ray tracing. The horizontal axis of FIG. 8 shows the radiance distribution of FIG. 7. The negative direction indicates the side of linear light source 4. The vertical axis of FIG. 8 indicates a standardized luminance. In FIG. 8, a dotted line 27 shows the radiance distribution of the first example while a line 26 indicates the radiance distribution of this example with 50° ($\phi_1$) and 87° ($\phi_2$) In this case, it is found that the center of the radiance distribution is almost perpendicular to top surface 15 of photoconductor 1. Also, the central luminance of the panel-form illuminating system of this example is improved by about 40% compared with that in the first example since the system of this example has three grooves per pitch. The optical path of the light emitting from photoconductor 1 is changed by the total reflection at inclined surfaces 20, 22 and 24. Thus, the central angle ($\alpha$) of the radiance distribution is controlled by changing the angle ($\phi_1$) of the inclined slopes.

A correlation shown in the following Formula 9 is found in accordance with Snell's law, so that $\alpha$ and $\phi_1$ are expressed as in the following Formulas 10 and 11 respectively:

$$n \cdot \sin (50° - \phi_1) = \sin \alpha \quad \text{[Formula 9]}$$

wherein n represents a refractive index of the photoconductor;

$$\alpha = \sin^{-1} \{n \cdot \sin (50° - \phi_1)\}; \quad \text{[Formula 10]}$$

and $$\phi_1 = 50° - \sin^{-1} \{(1/n) \sin \alpha\}. \quad \text{[Formula 11]}$$

For example, if photoconductor 1 is made of acrylic and has a 1.49 refractive index (n), the angle ($\phi_1$) of inclined surfaces 20, 22 and 24 should be in the range of $43° < \phi_1 < 57°$ so as to set the central angle ($\alpha$) of the radiance distribution within $\pm 10°$.

As described above, in this embodiment, flat-panel type photoconductor 1 comprises linear light source 4 at the side, and three adjoining triangular grooves per pitch on the bottom surface; wherein light emits from top surface 15 of photoconductor 1 by the total reflections at each groove. Thus, the same effects as in the first example are found in this example. Also, as described above, luminance is further enhanced in this example.

In this example, even though three grooves are formed per pitch, the number is not limited to three. The number of grooves may be two or four, or more than four per pitch. As the number increases, luminance improves. However, a luminating sheet with around three grooves per pitch can be manufactured most easily.

In Examples 1 and 2, photoconductor 1 is a flat-panel type. However, the shape of a photoconductor is not limited to this. In order to reduce weight and to emit light efficiently from photoconductor 1, the cross-section of the photoconductor may have a straight or curved wedge shape with thinner sides.

EXAMPLE 3

Figure 9:
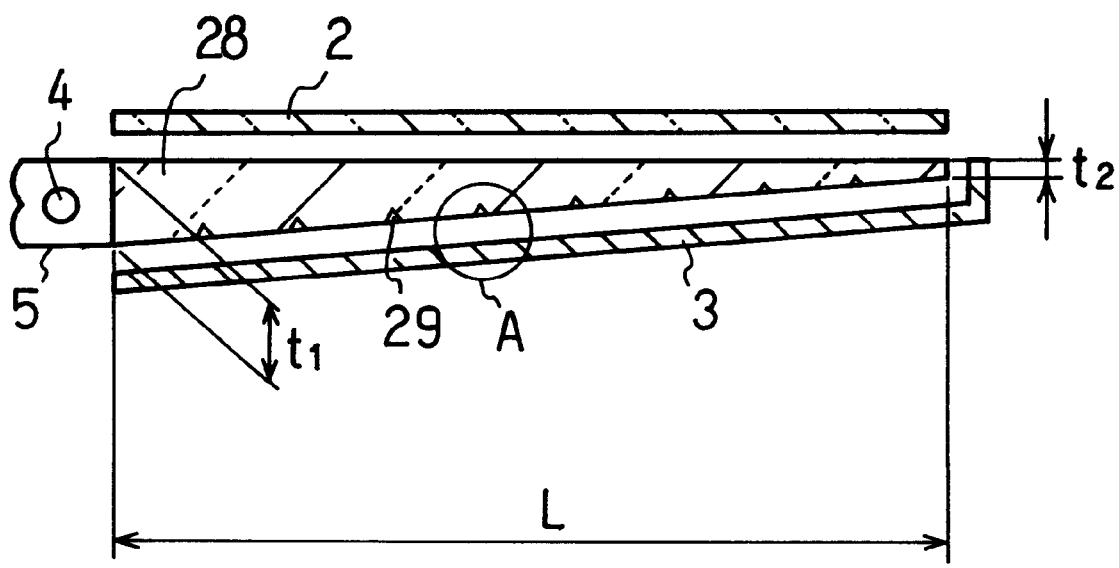
FIG. 9 is a cross-sectional view of a panel-form illuminating system of a third embodiment of the present invention.
Figure 10:
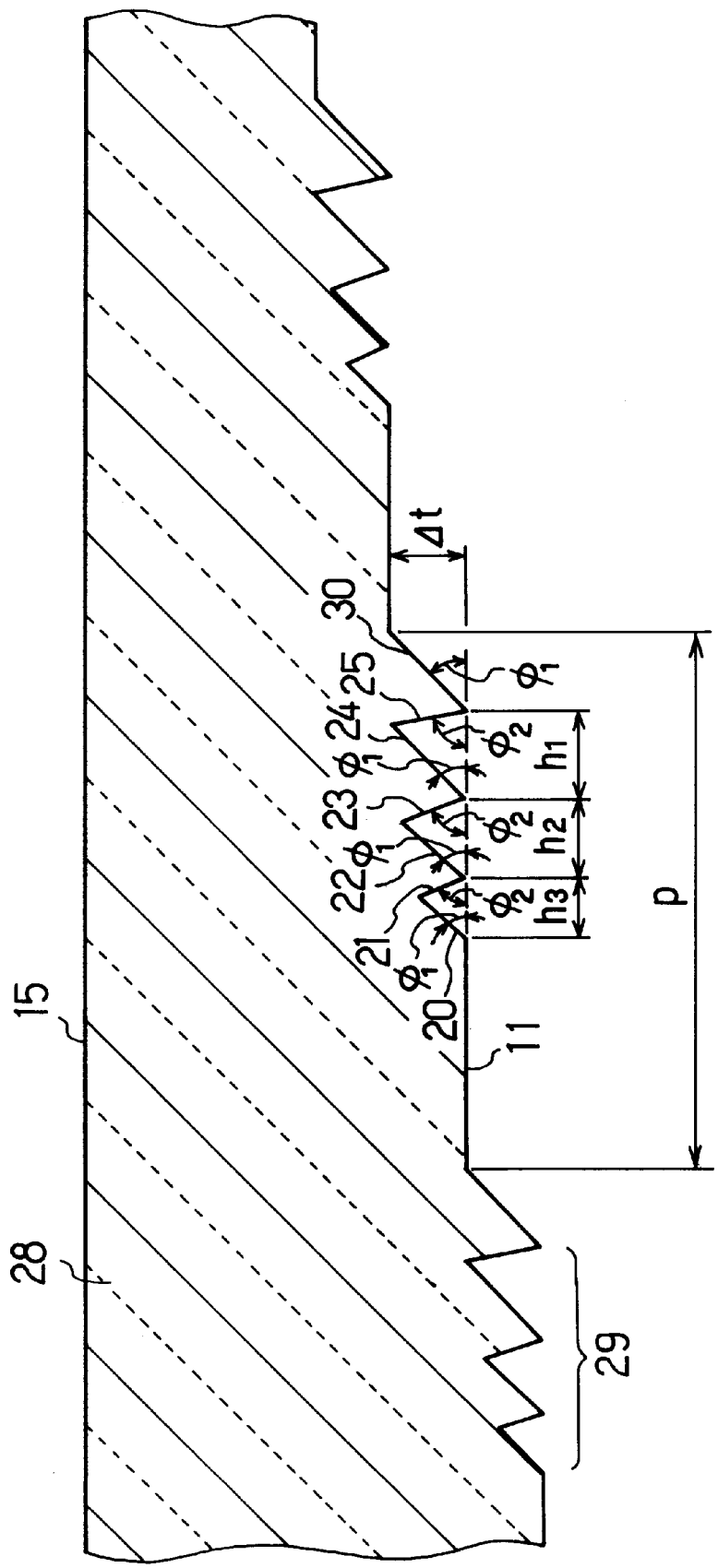
FIG. 10 is an enlarged cross-section of section A shown in FIG. 9.

FIG. 9 is a cross-sectional view of a panel-form illuminating system of a third embodiment of the present invention. FIG. 10 is an enlarged cross-sectional view of A section shown in FIG. 9. As shown in FIGS. 9 and 10, the bottom surface of a photoconductor 28 has a tier shape where adjoining grooves 29 are formed at each level. In other words, one level has a flat section 11, a third groove, a second groove, a first groove and an inclined surface 30 at a boundary between two levels. The third groove has an inclined surface 20 facing a linear light source 4 and an inclined surface 21 opposite to inclined surface 20; similarly, the second groove has inclined surfaces 22 and 23; and the first groove has inclined surfaces 24 and 25. The grooves have triangular cross-sections. Flat section 11 is almost parallel to a top surface 15 of photoconductor 28, and the grooves are adjoining each other. The angle ($\phi_1$) of inclined surfaces 20, 22, 24 and 30 is almost the same while the angle ($\phi_2$) of inclined surfaces 21, 23 and 25 is the same. In other words, the grooves have the same shape. In order to set the center of a radiance distribution of the light emitting from photoconductor 28 nearly perpendicular to top surface 15 of photoconductor 28, the angle ($\phi_1$) should be around 50°. Also, in order to set the center of the radiance distribution within $\pm 10°$ relative to the normal direction of top surface 15, the angle ($\phi_1$) should be within the range of around $43° < \phi_1 <$ about 57°. Furthermore, in order to shift the center of the radiance distribution in a predetermined direction ($\alpha$) of FIG. 9 (where $\alpha$ is the central angle of the radiance distribution), the angle ($\phi_1$) can be set as in the following Formula 12:

$$\phi_1 = 50° - \sin^{-1} \{(1/n) \sin \alpha\} \quad \text{[Formula 12]}$$

wherein n represents a refractive index of the photoconductor.

As the angle ($\phi_2$) is closer to 90°, radiance from photoconductor 28 becomes high. It is practical if the angle ($\phi_2$) is within the range of $60° < \phi_2 < 90°$. In consideration of preparing photoconductor 28 by press molding, injection molding, roller molding or the like, it is preferable to set draft leaves at around 3°. Thus, the angle ($\phi_2$) should be around 87° or smaller.

When the widths of the first, second and third grooves are h1, h2 and h3 respectively, it is preferable that h1>h2>h3. It is also preferable that the groove width becomes small as the groove is closer to linear light source 4. For instance, when a ratio of the width of the "n-th" groove relative to that of the first groove is hn, hn should be equal to $\gamma^{n-1}$. In this case, $\gamma$ is preferably in the range of 0.5–1.0, or more preferably around 0.8.

Photoconductor 28 is thicker as its section is closer to linear light source 4, and is thinner as it is farther from the light source. The height of each level ($\Delta t$) is constant; the envelope of photoconductor 28 is flat; and photoconductor 28 has a wedge shape. The smaller the thickness (t2) of the side of photoconductor 28 opposite linear light source 4, the larger the radiance from photoconductor 28 is. When the thickness of photoconductor 28 on the side of linear light source 4 is t1, it is preferable that t2/t1 is 0.5 or less. If the length of photoconductor 28 is L, the wedge angle of photoconductor 28 is expressed as $\tan^{-1}\{(t2-t1)/L\}$.

As in Example 2, the incident light to photoconductor 28 is totally reflected by inclined surfaces 20, 22, 24 and 30, and then exits from top surface 15 of photoconductor 28. Photoconductor 28 is thinner as its section is farther away from linear light source 4, so that the light from the light source does not return to the light source after being reflected by the side of photoconductor 28, which is opposite to the side closer to the light source. As a result, optical efficiency becomes excellent.

Figure 11:
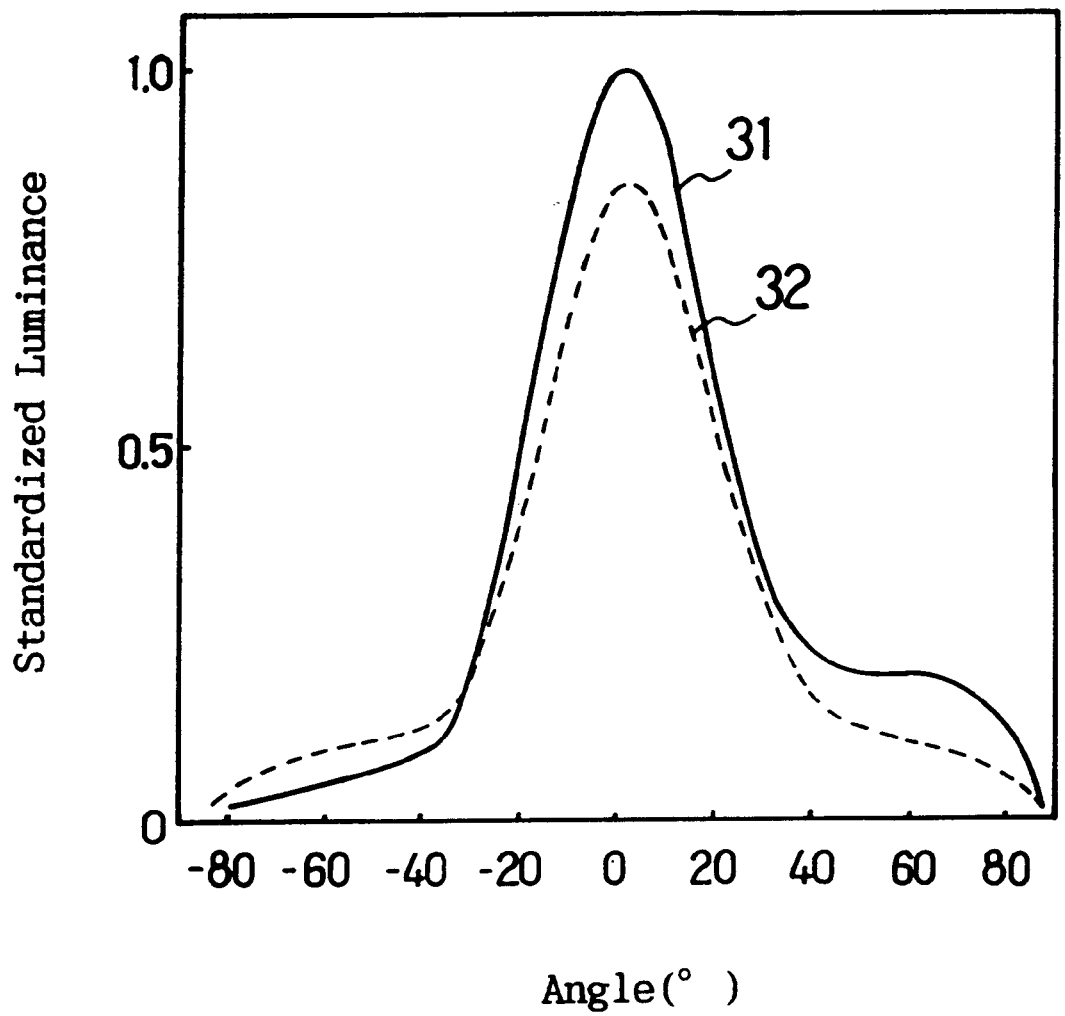
FIG. 11 is a radiance distribution of the light emitting from the photoconductor of the panel-form illuminating system of the third embodiment of the present invention.

FIG. 11 shows the radiance distribution of light emitting from photoconductor 28, found by ray tracing. The horizontal axis in FIG. 11 indicates the radiance distribution of FIG. 9. The negative direction indicates the side of linear light source 4. The vertical axis of FIG. 11 shows a standardized luminance. In FIG. 11, a dotted line 32 indicates the radiance distribution of Example 2 while a line 31 shows the radiance distribution of this example with 50° ($\phi_1$), 87° ($\phi_2$) and 1.83° (wedge angle). In this case, it is found that the center of the radiance distribution is almost perpendicular to top surface 15 of photoconductor 28. The central luminance of the panel-form illuminating system of this example is improved by about 20% compared with that in the second example since the system of this example has three grooves per pitch and a 1.83° wedge angle. The optical path of the light emitting from photoconductor 28 is changed to a large extent by the total reflection at inclined surfaces 20, 22, 24 and 30. Thus, by changing the angle ($\phi_1$), the central angle ($\alpha$) of the radiance distribution is controlled.

A correlation shown in the following Formula 13 is found in accordance with Snell's law, so that $\alpha$ and $\phi_1$ can be expressed as in Formulas 14 and 15 respectively:

$$n \cdot \sin(50°-\phi_1) = \sin\alpha \qquad \text{[Formula 13]}$$

wherein n represents a refractive index of the photoconductor;

$$\alpha = \sin^{-1}\{n \cdot \sin(50°-\phi_1)\}; \qquad \text{[Formula 14]}$$

and $$\phi_1 = 50° - \sin^{-1}\{(1/n)\sin\alpha\}. \qquad \text{[Formula 15]}$$

For example, if photoconductor 28 is made of acrylic and has a 1.49 refractive index (n), the angle ($\phi_1$) should be in the range of 43°<$\phi_1$<57° so as to set the central angle ($\alpha$) of the radiance distribution within ±10°.

As described above, in this embodiment, linear light source 4 is placed at the side of photoconductor 28, and the bottom surface of the photoconductor has a tier shape. Thus, the photoconductor is thinner as a section of the photoconductor is farther from the light source. Furthermore, three adjoining triangular grooves per pitch are formed on the bottom surface. Thus, the same effects as in the second example are obtained in this example. Also, as described above, the enhancement of luminance is also accomplished in this example.

In this example, even though three grooves are formed per pitch, the number is not limited to three. The number of grooves may be two or four, or more than four per pitch. As the number increases, luminance improves. However, a luminating sheet with around three grooves per pitch can be manufactured most easily.

In this embodiment, the height of each level ($\Delta t$) is fixed, but can also be varied depending on the distance from linear light source 4. For instance, $\Delta t$ may be determined in accordance with the depth of the first groove. In this case, the cross-section of the envelope at the bottom surface of photoconductor 28 will be shown as a curve connecting the bottom end of the side facing the linear light source 4 and the opposite end of the top surface.

Even though grooves are formed at each step in this example, the luminating sheet of the present invention is not limited to this structure. For instance, the luminating sheet may have a step with no grooves.

EXAMPLE 4

Figure 12:
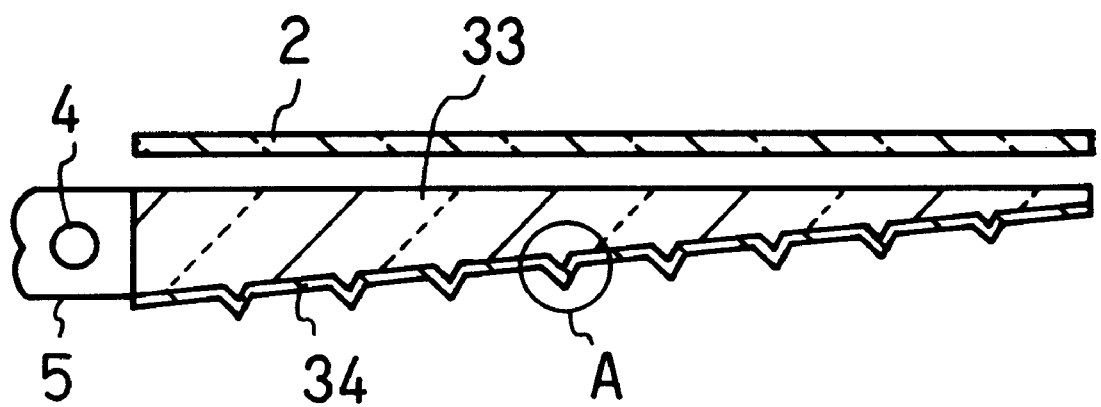
FIG. 12 is a cross-sectional view of a panel-form illuminating system of a fourth embodiment of the present invention.

FIG. 12 is a cross-sectional view of a photoconductor of a panel-form illuminating system of a fourth embodiment of the present invention. This panel-form illuminating system basically has the same structure as in the third example, except that the bottom surface of a photoconductor of this example has a different shape and is covered with a material of a high reflectance instead of reflective plate 3.

Figure 13:
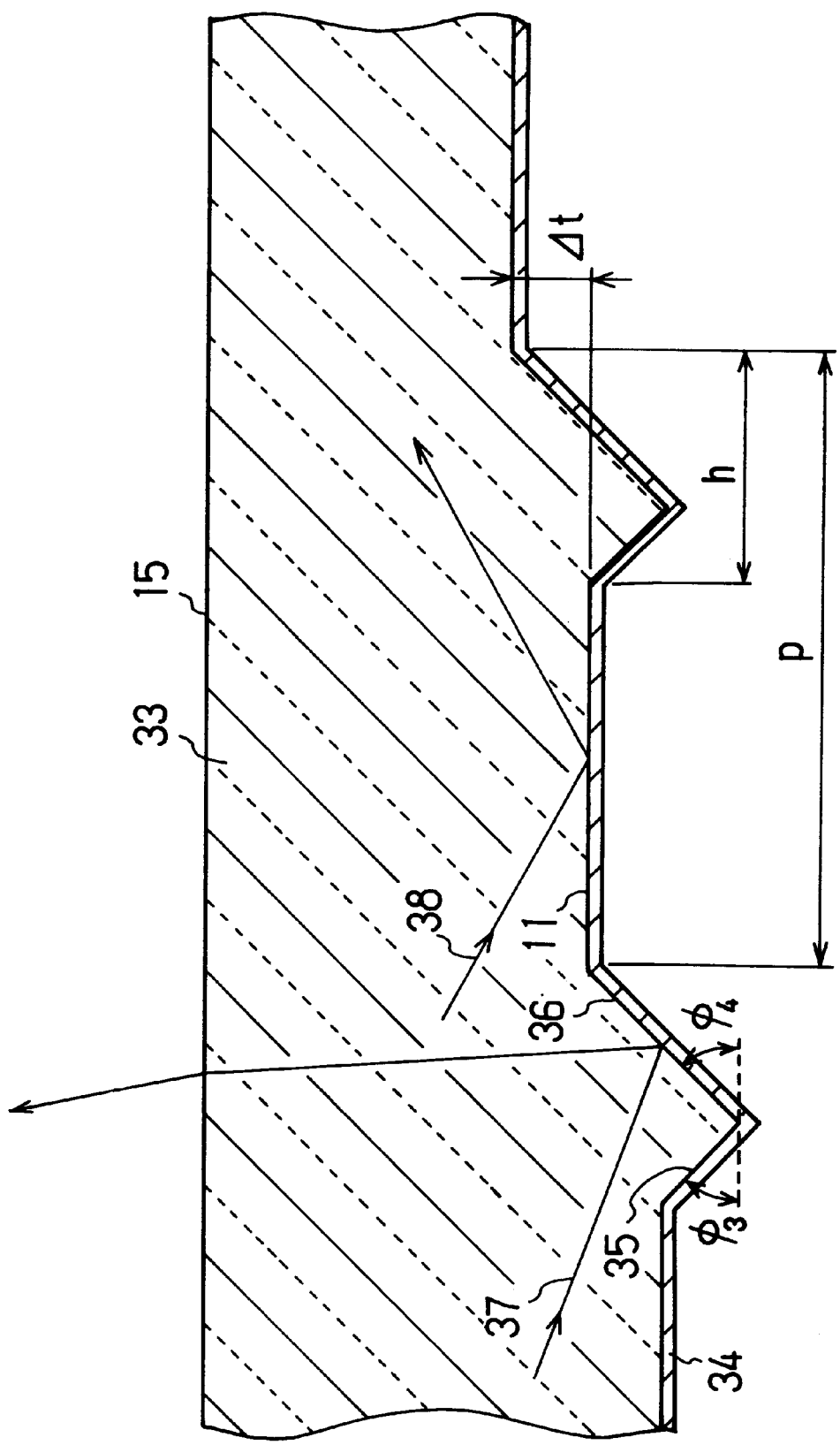
FIG. 13 is an enlarged cross-section of section A shown in FIG. 12.

As shown in FIGS. 12 and 13, the bottom surface of photoconductor 1 has a tiered shape and is formed with triangular protrusions consisting of an inclined surface 35 facing linear light source 4 and an inclined surface 36 opposite to inclined surface 35. In this example, the height of each level ($\Delta t$) is constant. When the refractive index of photoconductor 33 is n, the angle ($\phi_3$) of inclined surfaces 35 is set so as to satisfy the following Formula 16:

$$\phi_3 > 90° - \sin^{-1}(1/n). \qquad \text{[Formula 16]}$$

A flat section 11 of the bottom surface of photoconductor 33 is almost parallel to a top surface 15 of photoconductor 33. On the bottom surface of photoconductor 33, a material of a high reflectance, e.g., silver, aluminum or a multilayer dielectric film is deposited so as to form a reflective film 34. Thus, light is reflected by flat section 11 and also by inclined surfaces 35 and 36.

The operations of the above-described panel-form illuminating system will be described below. Among the rays transmitting inside photoconductor 33, the incident light to flat section 11 (ray 38) transmits inside photoconductor 33 as it is repeatedly and totally reflected in the photoconductor. The incident light to inclined surface 36 (ray 37) changes its optical path due to the total reflection at inclined surface 36, and then emits to the outside from top surface 15 of photoconductor 33. The maximum angle of incidence of the light transmitting inside photoconductor 33 is $\{90°-\sin^{-1}(1/n)\}$ at top surface 15 or the bottom surface of photoconductor 33. On the other hand, since the angle of inclined surface 35 ($\phi_3$) is $\{90°-\sin^{-1}(1/n)\}$ or smaller, there is little incident light to inclined surface 35.

As described above, in this embodiment, linear light source 4 is provided at the side of photoconductor 33, and the bottom surface of photoconductor 33 has protrusions having inclined surfaces 35 and 36 and is also formed with reflective film 34, so that light emits from top surface 15 of photoconductor 33 due to the total reflection of light on inclined surface 36. Thus, the same effects as in the third example are found in this example. Also, with no application of reflective plate 3 (shown in FIG. 9), the number of sheets can be reduced, so that the construction and mass-production of the illuminating system become more efficient.

Even though the bottom surface of photoconductor 33 has a step shape, the photoconductor is not limited to this shape. The height of each step ($\Delta t$) may be zero.

EXAMPLE 5

Figure 14:
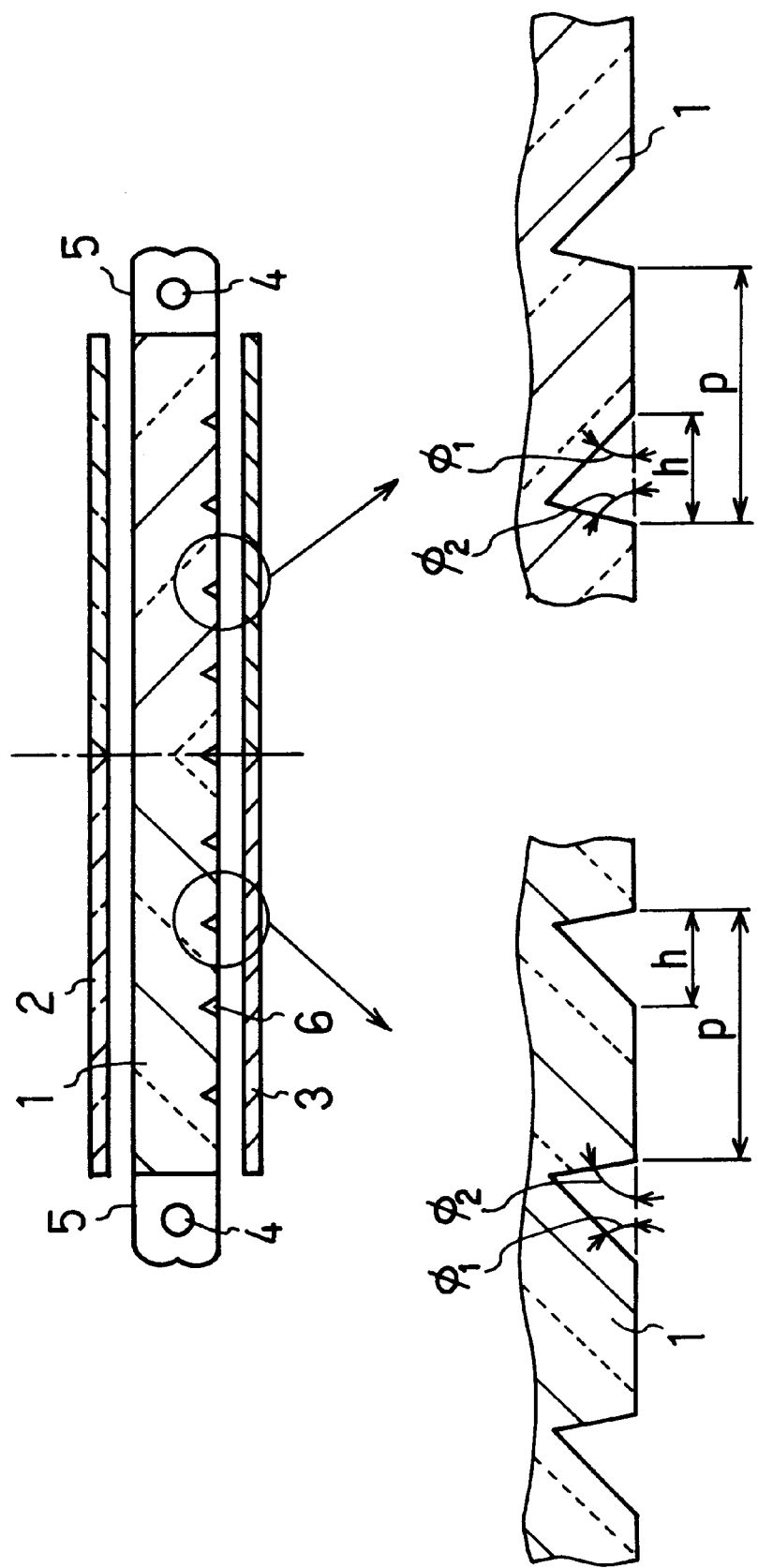
FIG. 14 is a cross-sectional view of a panel-form illuminating system of a fifth embodiment of the present invention.

FIG. 14 is a cross-sectional view of a panel-form illuminating system of a fifth embodiment of the present invention. As shown in FIG. 14, the panel-form illuminating system of this example basically has the same structure as in the first example. However, the panel-form illuminating system of this example is symmetrical along its central axis. Two photoconductors 28 are joined together at the central axis of the system, thus locating linear light sources 5 at both ends of the system.

Due to the structure mentioned above, the same effects as in the first example are obtained in this example. Also, since the system of this example has two linear light sources 4, the luminance in this example is twice as great as that in the first example.

The grooves in this example have the same structure as in the first example, but are not limited to this structure. The structure in the second example may be applied instead.

EXAMPLE 6

Figure 15:
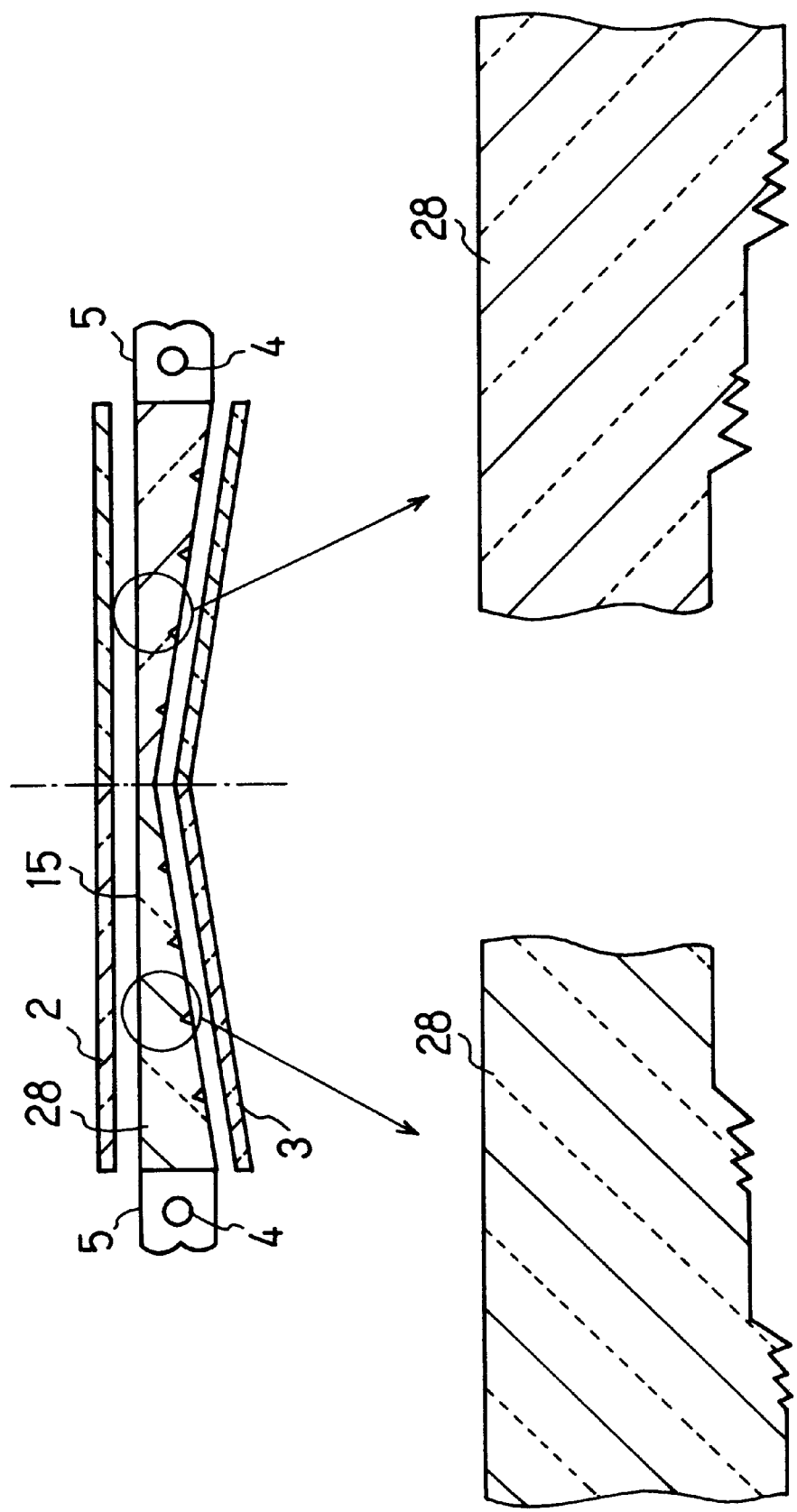
FIG. 15 is a cross-sectional view of a panel-form illuminating system of a sixth embodiment of the present invention.

FIG. 15 is a cross-sectional view of a panel-form illuminating system of a sixth embodiment of the present invention. As shown in FIG. 15, the illuminating system of this example basically has the same structure as in the third example, but is symmetrical along its central axis. Two photoconductors 28 are joined together at the central axis of the system, thus locating linear light sources 4 at both ends of the system.

Due to the structure mentioned above, the same effects as in the third example are found in this example. Also, since the system of this example has two linear light sources 4, the luminance in this example is twice as great as that in the third example.

The grooves in this example have the same structure as in the first example, but are not limited to this structure. The structure in the second example may be applied instead.

Figure 16:
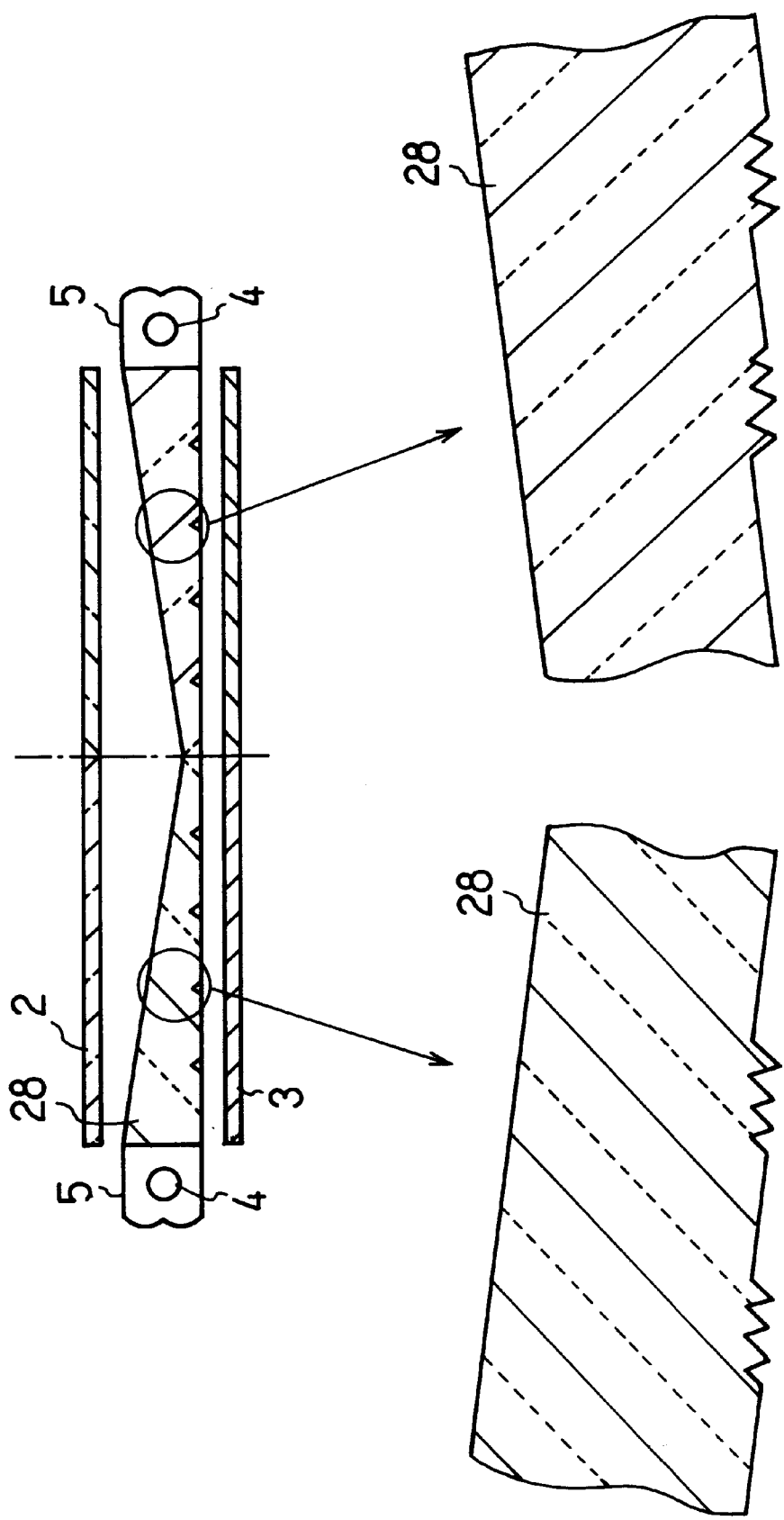
FIG. 16 is a cross-sectional view of another panel-form illuminating system of the sixth embodiment of the present invention.

As shown in FIG. 16, two photoconductors 28 of Example 3 may be joined together so as to form a flat envelope for the bottom surfaces of the photoconductors.

EXAMPLE 7

Figure 17A:
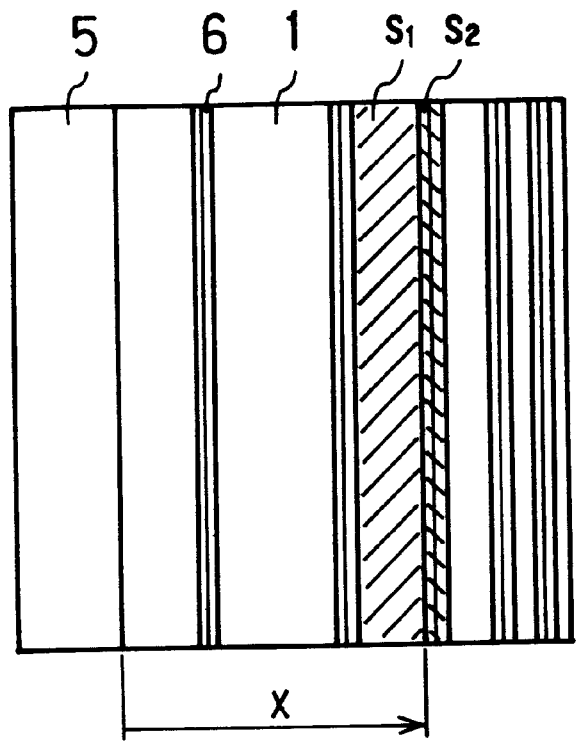
FIGS. 17(a) and (b) show a groove distribution on the photoconductor bottom surface of a panel-form illuminating system of a seventh embodiment of the present invention.
Figure 17B:
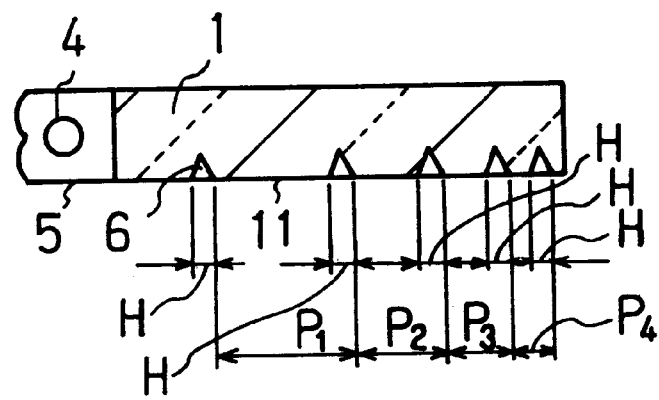

FIGS. 17(a) and 17(b) shows a groove distribution on the bottom surface of a photoconductor of a panel-form illuminating system of a seventh embodiment of the present invention. As shown in FIG. 17, the panel-form illuminating system of this example basically has the same structure as in the first example, except for the groove distribution on the bottom surface of photoconductor 1. The direction of grooves 6 is almost parallel to the longitudinal direction of linear light source 4. With a constant width (H) of grooves 6, the pitches (P1, p2, p3 and p4) of grooves 6 are changed. As the grooves are closer to linear light source 4, the pitches (p) become large; and they become smaller as the grooves are away from the light source.

With a distance (x) between a groove and the side of photoconductor 1 facing linear light source 4, an area ratio (S) at distance (x) {where $S=s_2/(s_1+s_2)$ with an area ($s_1$) of a flat section 11 and an area ($s_2$) of groove 6 at distance (x)}, and a photoconductor length (L), a correlation shown in the following Formula 17 is found as in the first example:

$$S=\alpha \cdot \beta^{X/L}. \qquad \text{[Formula 17]}$$

In this case, it is preferable that S is in the range of $0<S<\frac{1}{2}$ while $\beta$ is in the range of $1.0<\beta<4.0$. In order to provide a uniform luminance distribution of the light emitting from photoconductor 1, $\alpha$ and $\beta$ should be around 0.04 and 3.0 respectively.

In this example the same effects as in the first example are obtained.

EXAMPLE 8

Figure 18A:
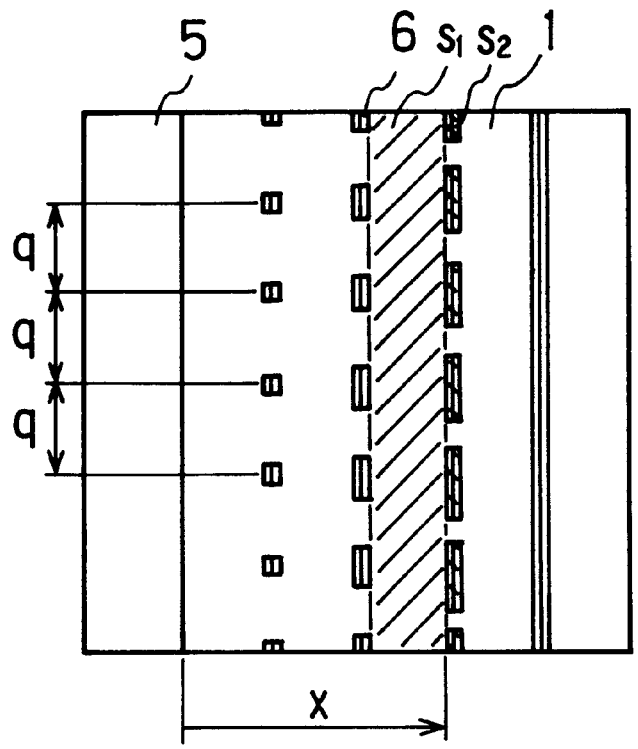
FIGS. 18(a) and (b) show a groove distribution on the photoconductor bottom surface of a panel-form illuminating system of an eighth embodiment of the present invention.
Figure 18B:
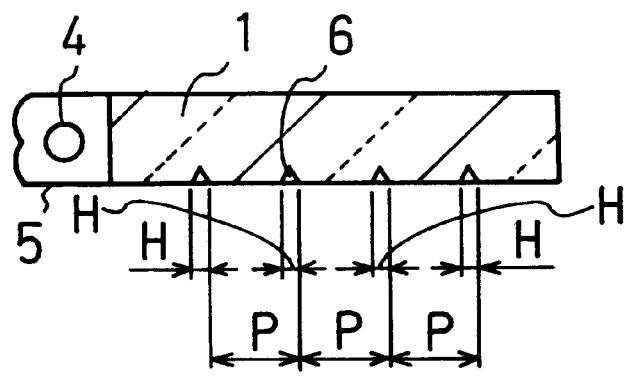

FIGS. 18(a) and 18(b) show a groove distribution on the bottom surface of a photoconductor of a panel-shaped illuminating system of an eighth embodiment of the present invention. As shown in FIGS. 18(a) and 18(b), the panel-form illuminating system of this example basically has the same structure as in the first example, except for the groove distribution on the bottom surface of photoconductor 1.

The direction of grooves 6 is almost parallel to the longitudinal direction of linear light source 4. The width (H) and pitch (p) of grooves 6 are constant in a perpendicular direction to the longitudinal direction of linear light source 4. The lengths of grooves 6 in the longitudinal direction of the light source are shorter as the grooves are closer to the light source; and the lengths are longer as the grooves are farther away from the light source. The pitch (q) of grooves 6 in the longitudinal direction of linear light source 4 is preferably the same as the pitch (p) of grooves 6 in the horizontal direction relative to the longitudinal direction of the light source.

With a distance (x) between a groove and the side of photoconductor 1 facing linear light source 4, an area ratio (S) at distance (x) {where $S=s_2/(s_1+s_2)$ with an area ($s_1$) of a flat section 11 and an area ($s_2$) of groove 6 at distance (x)}, and a photoconductor length (L), a correlation shown in the following Formula 18 is found as in the first example:

$$S=\alpha \cdot \beta^{X/L}. \qquad \text{[Formula 18]}$$

In this case, it is preferable that S is in the range of $0<S<\frac{1}{2}$ while $\beta$ is in the range of $1.0<\beta<4.0$. In order to provide a uniform luminance distribution of the light emitting from photoconductor 1, $\alpha$ and $\beta$ should be around 0.04 and 3.0 respectively.

In this example the same effects as in the first example are obtained.

EXAMPLE 9

Figure 19A:
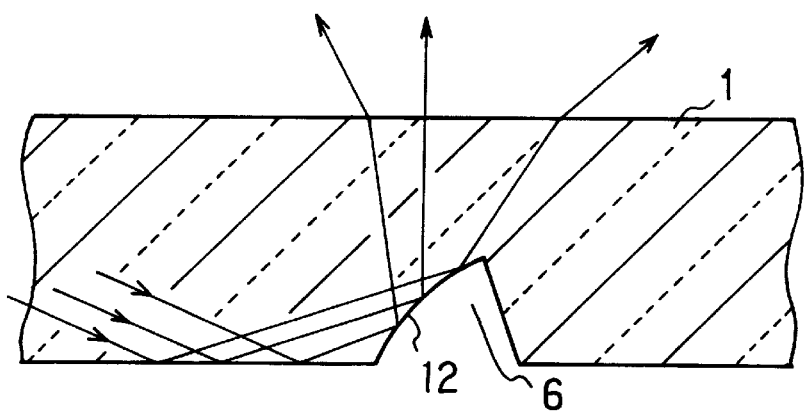
FIGS. 19(a), (b) and (c) show a groove distribution on the photoconductor bottom surface of a panel-form illuminating system of a ninth embodiment of the present invention.
Figure 19B:
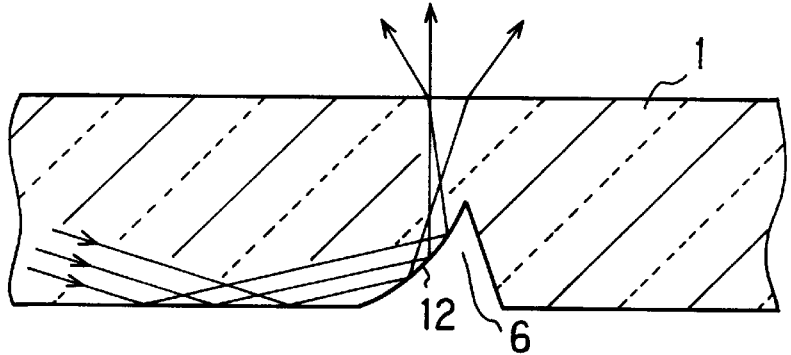
Figure 19C:
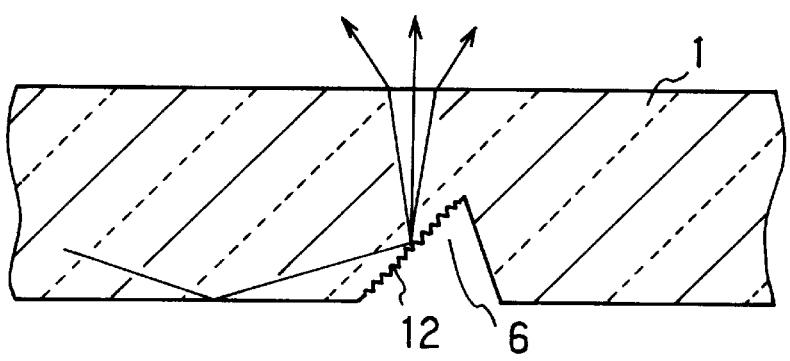

FIGS. 19(a), (b) and (c) show the shape of grooves on the bottom surface of a photoconductor of a panel-shaped illuminating system of a ninth embodiment of the present invention. The panel-form illuminating system of this example basically has the same structure as in the first example, except for the shape of the grooves. As shown in FIGS. 19(a) and (b), an inclined surface 12 of groove 6 facing linear light source 4 is curved, so that the radiance distribution of the light emitting from photoconductor 1 can be widened. Also, as shown in FIG. 19(c), inclined surface 12 can be roughened, thus diffusing reflected light and widening the radiance distribution of the light emitting from photoconductor 1.

In the structure mentioned above, the same effects as in the first example are obtained. Furthermore, by making inclined surface 12 curved or roughened, a radiance distribution can be widened, so that the system can be applied for a liquid crystal display with a wide angle visibility.

In the above-mentioned Examples 1 to 9, the top surface and the side of the photoconductor are perpendicular to each other. However, the photoconductor is not limited to this structure. As long as the incident light from the side of the photoconductor is totally reflected inside the photoconductor, the angle between the top surface and side may be in the range of 80–100° or the side may be warped.

Even though the distribution of grooves is expressed by an exponential function in the above-described Examples 1 to 9, it may be expressed by a polynominal as shown in the following Formula 19:

$$S = a_0 + a_1 \cdot x/L + a_2 x^2/L \qquad \text{[Formula 19]}$$

wherein $a_0, a_1, \ldots$ represent coefficients determined by the inplane radiance distribution of light emitting from photoconductor, L represents a photoconductor length, and x represents a distance between a groove and the side of photoconductor facing linear light source.

In Examples 1 to 9 mentioned above, reflector 5 has a cross-section shaped like two adjoining ellipses. However, the shape of the cross-section is not limited to this, and may be U-shape or semicircular.

Figure 20:
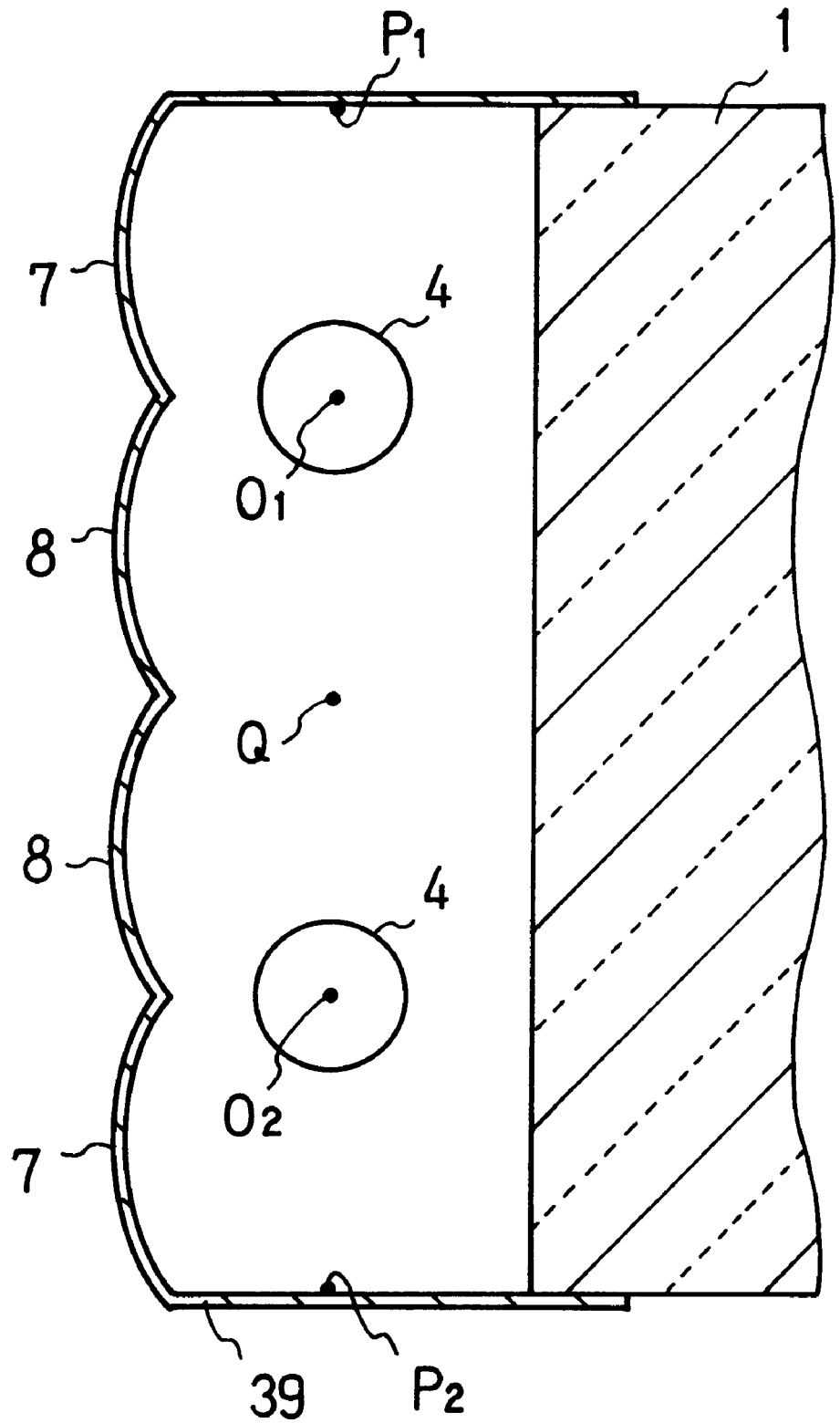
FIG. 20 is a cross-sectional view of light sources and a reflector of another example of the present invention.

In Examples 1 to 9 mentioned above, one linear light source 4 is applied. However, as shown in FIG. 20, two linear light sources 4 can be applied, and elliptical sections 7 and 8 may be applied for each light source. This is also the same in the case of providing three or more linear light sources 4.

In Examples 3 and 6, the grooves are formed next to each step. However, the structure is not limited to this, and the grooves may be formed at any section on the bottom surface of the photoconductor.

The distribution of grooves in Examples 7 and 8 may be applied to the above-noted Examples 2 to 6.

While satisfying the conditions of (S) at (x) in Examples 1 to 9, the distributions of grooves in Examples 1, 5 and 6 may be combined.

The shape of grooves mentioned in Example 9 may be applied to Examples 2 to 8.

EXAMPLE 10

Figure 21:
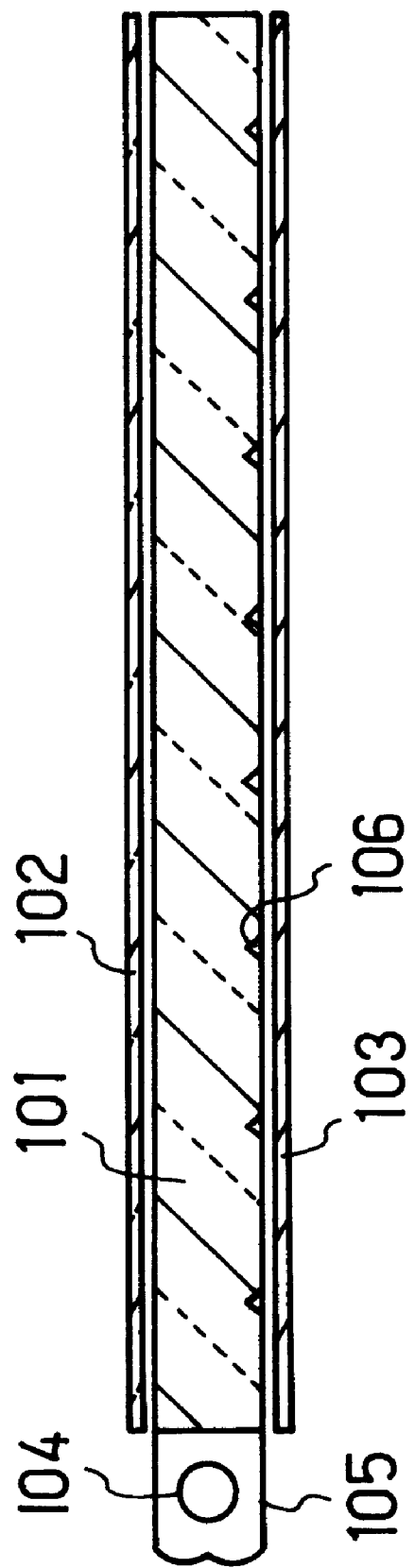
FIG. 21 is a cross-sectional view of a panel-form illuminating system of a tenth embodiment of the present invention.

FIG. 21 is a cross-sectional view of a panel-form illuminating system of a tenth embodiment of the present invention.

Figure 22:
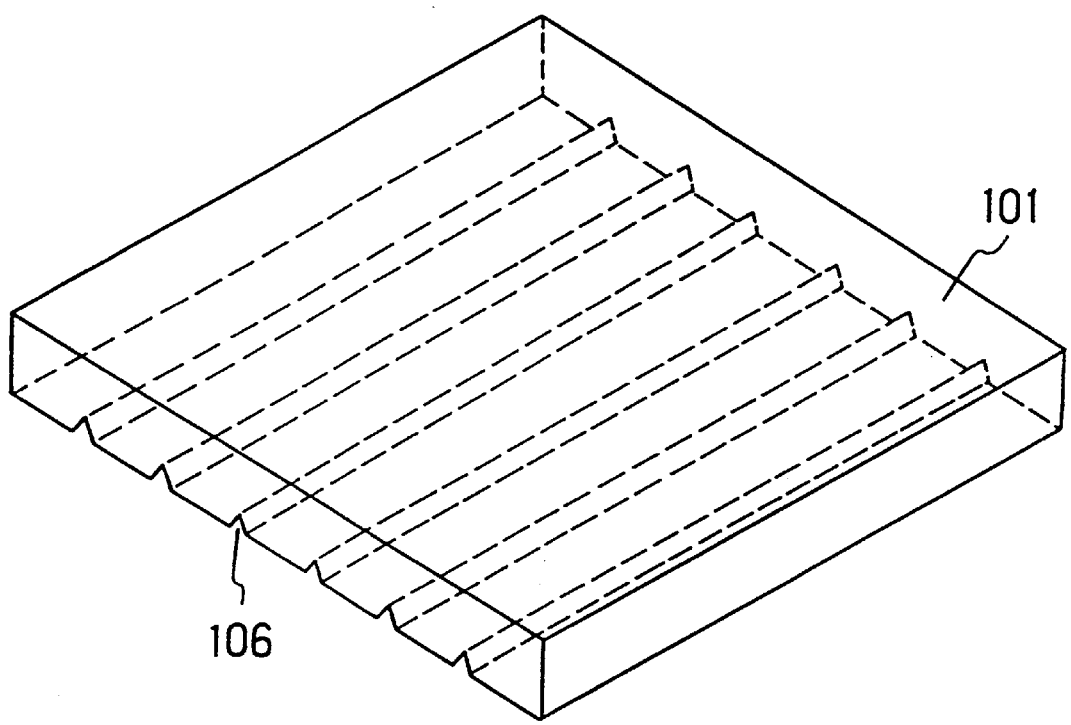
FIG. 22 is a perspective view of a photoconductor of the panel-form illuminating system of the tenth embodiment of the present invention.

In FIGS. 21 and 22, 101 indicates a photoconductor, which is made of quartz, glass, transparent resin (such as acrylic resin and polycarbonate) or the like. In this example, in order to simplify the explanation, photoconductor 101 has a flat-panel shape, and the side surfaces are perpendicular to the top and bottom surfaces of photoconductor 1. Photoconductor 101 has a 1.5 refractive index (n). For a linear light source 104, fluorescent light, an incadescent lamp or LED may be arranged. Linear light source 104 is placed almost parallel to the side of photoconductor 101. Reference number 105 indicates a reflector, and is positioned so as to surround linear light source 104 (as shown in FIG. 21). The surfaces of reflector 105 facing linear light source 104 are deposited with a material of a high reflectance such as silver or aluminum. The end of reflector 105 has two bumps. The bumps may have a thin elliptical shape or fan shape. On the bottom surface of photoconductor 101, grooves 106 parallel to linear light source 104 are formed. In other words, the bottom surface has the sections of grooves 106 and flat sections where no grooves are formed. The pitch (p) of grooves 106 (shown in FIG. 25) is constant, and the width of the groove is smaller than the pitch (p). In this example, the cross-section of grooves 106 has an isosceles triangle shape with an apex angle β (shown in FIG. 25).

A light diffusing sheet 102 is positioned above the top surface of photoconductor 101 so as to cover the top surface while a reflective sheet 103 is placed below the bottom surface of photoconductor 101 so as to cover the bottom surface. The sections of reflective sheet 103 facing grooves 106 are deposited with a material of a high reflectance such as silver or aluminum.

Figure 23:
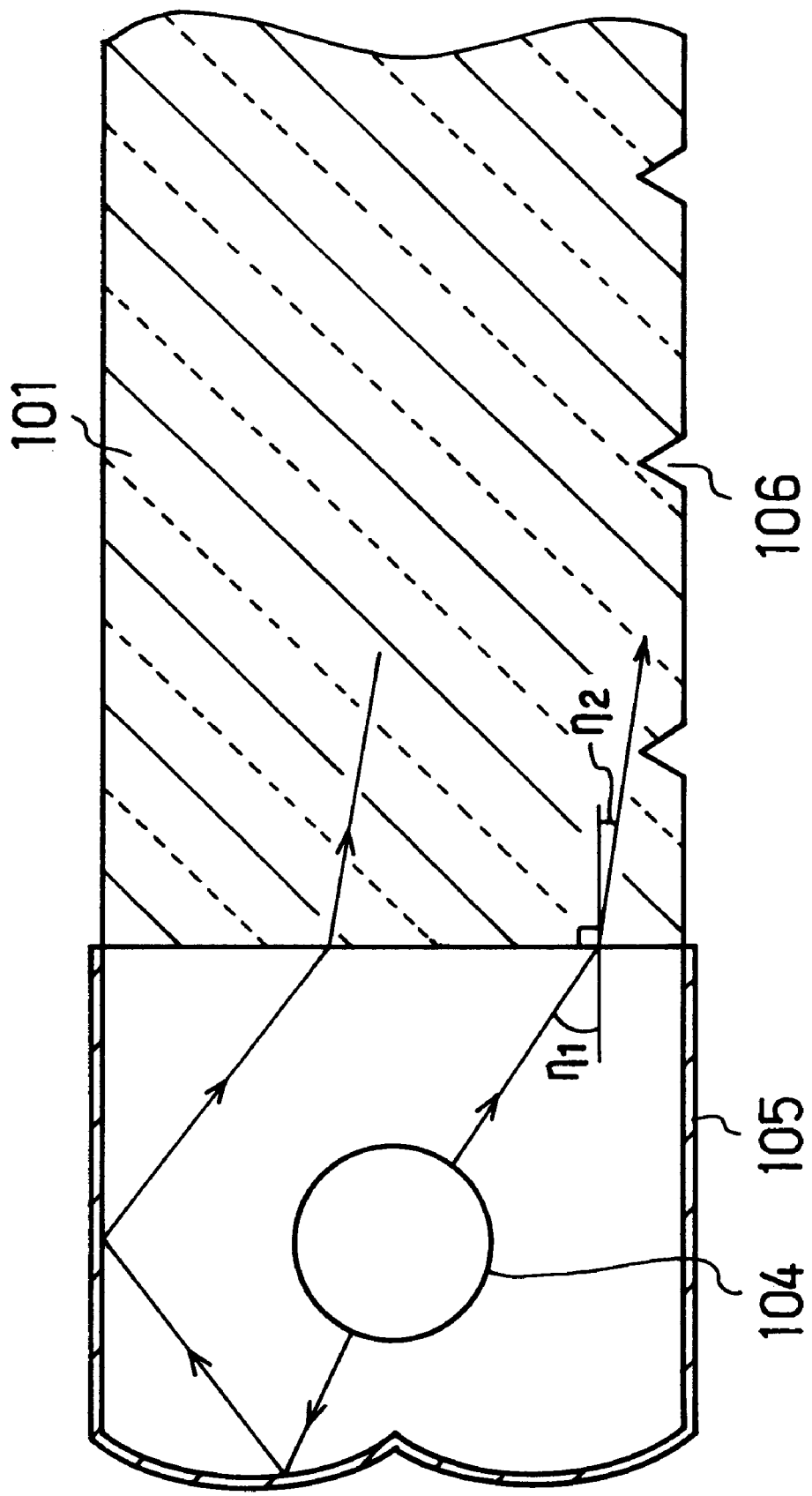
FIG. 23 shows an optical path track in relation to a linear light source and a reflector of the panel-form illuminating system of the tenth embodiment of the present invention.
Figure 24:
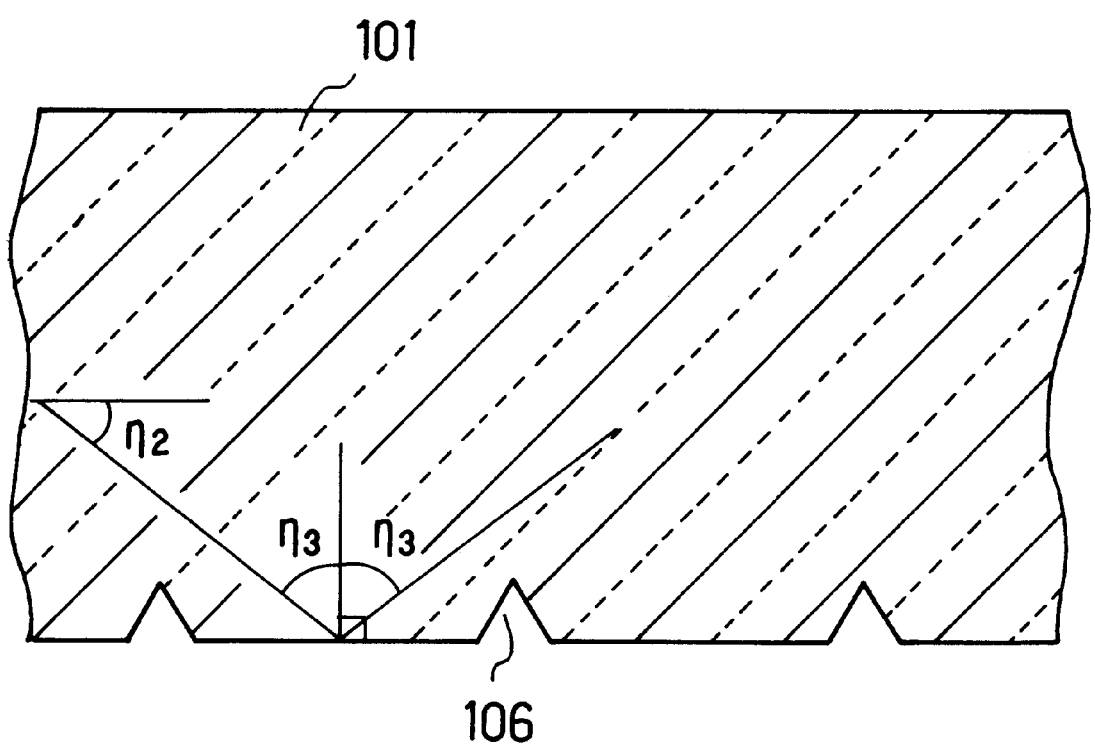
FIG. 24 shows an optical path track inside the photoconductor of the panel-form illuminating system of the tenth embodiment of the present invention.
Figure 25:
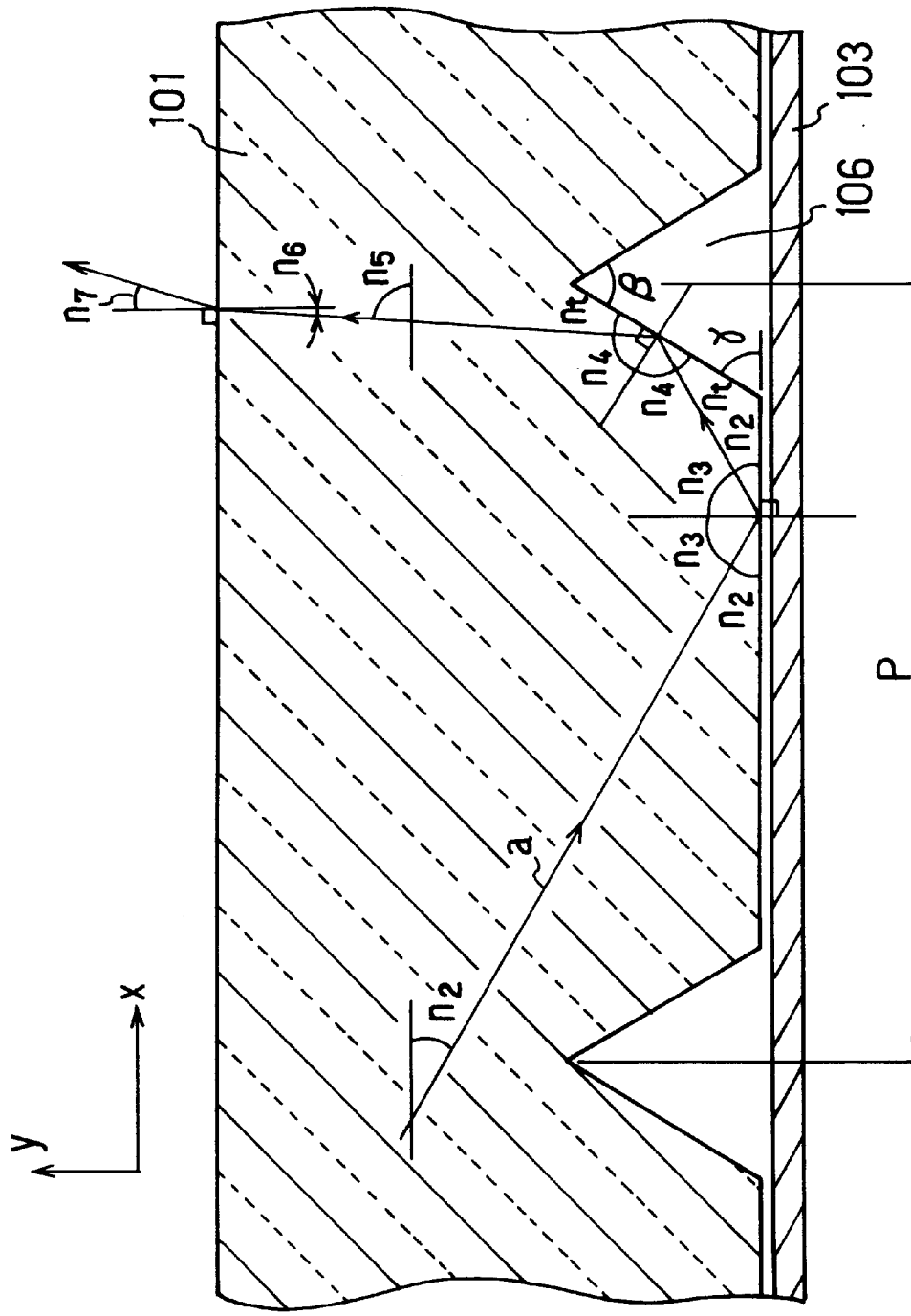
FIG. 25 shows an optical path track in relation to a groove of the photoconductor of the panel-form illuminating system of the tenth embodiment of the present invention.

The operations of the panel-form illuminating system mentioned above are explained by referring to FIG. 21 and FIGS. 23–25. FIG. 23 shows an optical path trace against the linear light source and the reflector; FIG. 24 shows an optical path trace inside the photoconductor; and FIG. 25 shows an optical path trace against a groove.

As shown in FIG. 23, the rays from linear light source 104 directly enter photoconductor 101, or are reflected by reflector 105 and then enter photoconductor 101. By adding two bumps to reflector 105, rays reflected at the bumps pass between the light source and reflector 105, and then enter photoconductor 101. When rays reenter linear light source 104, they are absorbed. However, by forming the bumps, the light absorption at the light source is reduced.

Incident light to the side of photoconductor 101 at the incidence angle of $\eta_1$ is refracted to the angle of $\eta_2$ as it enters photoconductor 101. Since a correlation expressed as in the following Formula 20 is found in accordance with Snell's law, the angle of refraction ($\eta_2$) is expressed as in the following Formula 21:

$$\sin \eta_1 = n \cdot \sin \eta_2 \qquad \text{[Formula 20]}$$

wherein n represents a refractive index of the photoconductor; and $$\eta_2 = \sin^{-1}(\sin \eta_1/n). \qquad \text{[Formula 21]}$$

The maximum angle of refraction ($\eta_{2max}$) is expressed as in the following Formula 22;

$$\eta_{2max} = \sin^{-1}(\sin 90°/n)$$
$$= \sin^{-1}(1/n). \qquad \text{[Formula 22]}$$

For example, when the refractive index of photoconductor 101 is 1.5, $\eta_{2max}$ is 41.8°.

As shown in FIG. 24, incident light to the flat section has an incidence angle ($\eta_3$) expressed as in the following Formula 23:

$$\eta_3 = 90° < \eta_2. \qquad \text{[Formula 23]}$$

The total reflection angle at the boundary between a medium having a refractive index n (n>1) and air (refractive index 1) is expressed as $\sin^{-1}(1/n)$ based on Snell's law.

In order to repeat the total reflection of incident light from the side of photoconductor 101 at the top surface and the flat section outside the groove so as to transmit the light, the angle ($\eta_3$) should be larger than the total reflection angle ($\sin^{-1}(1/n)$). In other words, a correlation shown in the following Formula 24 should be satisfied:

$$\eta_3 > \sin^{-1}(1/n). \qquad \text{[Formula 24]}$$

From Formulas 22 and 23, the minimum angle ($\eta_{3min}$) is expressed as in the following Formula 25:

$$\eta_{3min} = 90° - \sin^{-1}(1/n). \qquad \text{[Formula 25]}$$

By applying the above-mentioned Formulas 24 and 25, the condition of a refractive index (n) so as to transmit light by the total reflection at the top surface and the flat section outside the groove is expressed as in the following Formula 26:

$n > 1/\sin 45° = 2^{1/2} \approx 1.414.$  [Formula 26]

In this example, since the refraction index (n) of photoconductor 101 is 1.5, this condition is satisfied. In general, with a material such as quartz, glass, acrylic resin and polycarbonate, the refraction index is $2^{1/2}$ or above, so that this condition is satisfied. Thus, incident light to the flat section transmits as the total reflection of the light is repeated inside photoconductor 101.

In FIG. 25, the x axis is parallel to the top surface of photoconductor 101 while the y axis is perpendicular to the top surface. The angle between the x axis and the direction of a transmitting ray is $\eta_2$.

Based on that condition, the maximum of $\eta_2$ is $\sin^{-1}(1/n)$ as obtained from the above-mentioned Formula 22.

As shown in FIG. 25, the ray (a) totally reflected by the flat section enters the inclined surface of groove 106. The ray (a) hits the flat section at the angle of incidence ($\eta_3$). Since the refractive index (n) of photoconductor 101 satisfies the condition of Formula 26 mentioned above, the total reflection is carried out. Then, the ray (a) hits the inclined surface of groove 16. Groove 16 has an isosceles triangle cross-section with an apex angle ($\beta$), so that the angle of inclined surface ($\gamma$) is expressed as in the following Formula 27:

$2\gamma + \beta = 180°$ $\gamma = 90° - \beta/2.$  [Formula 27]

The angle of incidence ($\eta_4$) at the inclined surface of groove 106 is expressed by the following Formula 28.

$\eta_t = \gamma - \eta_2$ $\eta_4 = 90° - \eta_t.$  [Formula 28]

The condition of the total reflection at the inclined surface of groove 106 is as shown in the following Formula 29:

$\eta_4 > \sin^{-1}(1/n).$  [Formula 29]

The ray totally reflected by the inclined surface of groove 106 hits the top surface of photoconductor 101. The angle of incidence ($\eta_6$) is expressed by the following Formula 30:

$\eta_5 = \eta_2 + 2\eta_t$ $= 180° - \beta - \eta_2$ $\eta_6 = 90° - \eta_5$ $= -90° + \beta + \eta_2.$  [Formula 30]

Based on Snell's law, the angle of emergence ($\eta_7$) from photoconductor 101 is expressed by the following Formula 31:

$n \sin \eta_6 = \sin \eta_7$ $\eta_7 = \sin^{-1}\{n \sin (\beta + \eta_2 - 90°)\}.$  [Formula 31]

From the above-mentioned Formulas 22, 28 and 29, the range of $\eta_2$ is obtained from the following Formula 32:

$\sin^{-1}(1/n) - \beta/2 < \eta_2 < \sin^{-1}(1/n).$  [Formula 32]

For instance, with a 60° apex angle of groove 106 and a 1.5 refractive index (n) of photoconductor 101, it is found that $11.8° < \eta_2 < 41.8°$ in accordance with Formula 32 and that $-27.90 < \eta_7 < 17.9°$ in accordance with Formula 31. Thus, when transmitting light emits from photoconductor 101, the center of a radiation distribution of photoconductor 101 becomes parallel to the top surface of the photoconductor.

With a 65° apex angle ($\beta$) of groove 106 and a 1.5 refractive index (n) of photoconductor 101, it is found that $9.3° < \eta_2 < 41.8°$ in accordance with Formula 32 and that $-23.9° < \eta_7 < 25.7°$ in accordance with Formula 31. Thus, the symmetry of the radiation distribution from photoconductor 101 becomes preferable.

With a 70° apex angle ($\beta$) of groove 106 and a 1.6 refractive index (n) of photoconductor 101, it is found that $3.7° < \eta_2 < 38.7°$ in accordance with Formula 32 and that $-26.7° < \eta_7 < 30.9°$ in accordance with Formula 31. Thus, the divergent angle of emitting light from photoconductor 101 can be changed.

As described above, by changing the refractive index (n) of photoconductor 101 and the apex angle ($\beta$) of groove 106, the direction and the divergent angle of emitting light from photoconductor 101 can be controlled.

Emitting light from the top surface of photoconductor 101 is diffused by light diffusing sheet 102 (shown in FIG. 21), so that a predetermined angle of visibility and a radiation distribution with no unevenness are provided.

Among transmitting rays inside photoconductor 101, the rays which directly hit the inclined surface of groove 106 reenter photoconductor 1 after transmitting through groove 106, or are reflected by reflective sheet 103 and then reenter photoconductor 101.

The quantity of emitting light from photoconductor 101 is controlled by placing grooves 106 at a fixed distance and by changing the depth of grooves 106, so that the unevenness in the quantity of emitting light is reduced. In other words, when groove 106 is shallow, the area of the inclined surface of groove 106 becomes small. Thus, the quantity of the light totally reflected by the inclined surface becomes small, and the quantity of emitting light from photoconductor 101 also becomes small. On the other hand, with a deep groove 106, the area of the inclined surface of groove 106 becomes large, so that the quantity of the light totally reflected by the inclined surface of groove 106 becomes large and the quantity of emitting light from photoconductor 101 also becomes large. Inside photoconductor 101, the quantity of light is larger as a section is closer to linear light source 104; and it is smaller as a section is further away from the light source. Therefore, the depth of grooves 106 is reduced as the grooves are closer to the light source; and the depth is increased as the grooves are further away from the light source, thus evenly providing the quantity of light emitting from photoconductor 101.

If a ratio of the depth relative to the gap of grooves 106 is at a predetermined level, the gap between grooves 106 does not have to be constant. For instance, the gaps between grooves 106 may be broadened as the grooves are closer to linear light source 104; and they can be narrowed as the grooves are further away from the light source.

A flat-panel photoconductor is also used in this example. However, the photoconductor is not limited to this type. In order to minimize the weight and to emit light efficiently, photoconductor 101 may have a straight or curved wedge shape having thinner sides. Furthermore, photoconductor 101 may be hollow.

In this example, the top surface, bottom surface and side of photoconductor 101 are perpendicular to each other. However, the structure is not limited to this. As long as the incident light from the side of photoconductor 101 is totally reflected inside the photoconductor, the top surface, bottom surface and side may be constructed in a way of providing an angle besides 90° between themselves, or the side surface may be curved.

Grooves 106 have an isosceles triangle cross-section in this example. However, the shape of the cross-section is not limited to this. When only one linear light source 104 is positioned at the side of photoconductor 101, the cross-section of grooves 106 may be triangular or may have round edges.

In order to widen the angle of visibility, a section of the inclined surfaces of grooves 106 may be roughened.

Even though one linear light source 104 is used in this example, a plurality of linear light sources 104 may be applied at each side of photoconductor 101 so as to increase luminance.

The refractive index (n) of photoconductor 101 is 1.5 in this example, but is not limited to this. It is preferable that (n) is 1.41 or higher.

Figure 26:
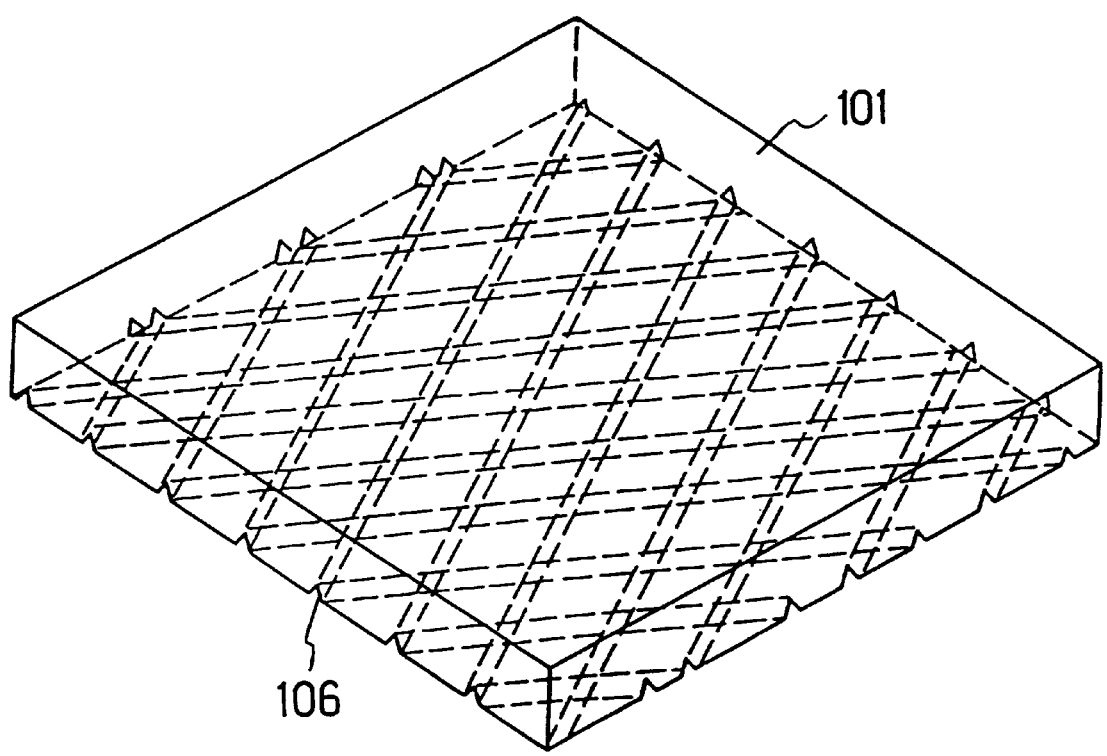
FIG. 26 is a perspective view of another photoconductor of the panel-form illuminating system of the tenth embodiment of the present invention.

Grooves 106 are formed so as to be parallel to linear light source 104, but the structure is not limited to this. As shown in FIG. 26, a plurality of grooves 106 may cross each other so as to prevent moire fringe with the picture element array of a liquid crystal panel.

EXAMPLE 11

Figure 27:
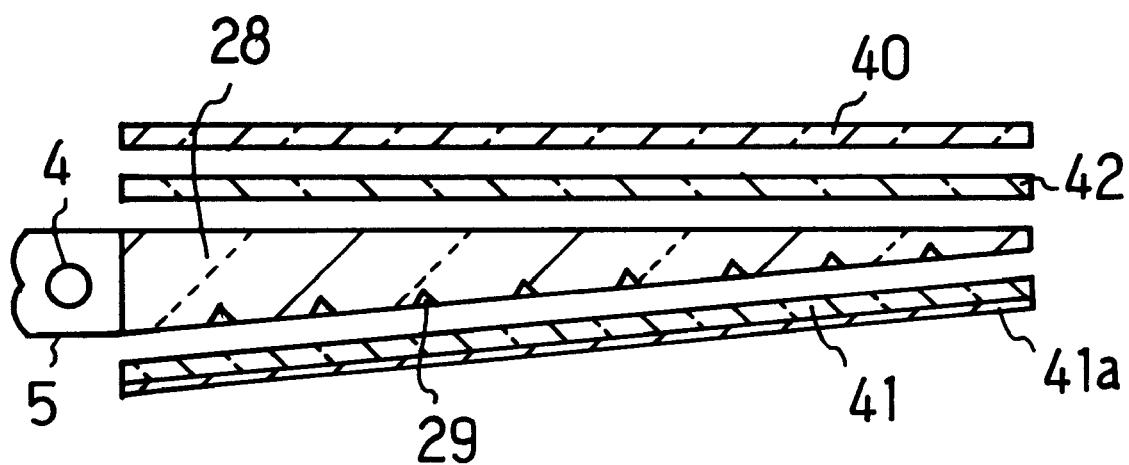
FIG. 27 is a cross-sectional view of a panel-form illuminating system of an eleventh embodiment of the present invention.
Figure 28:
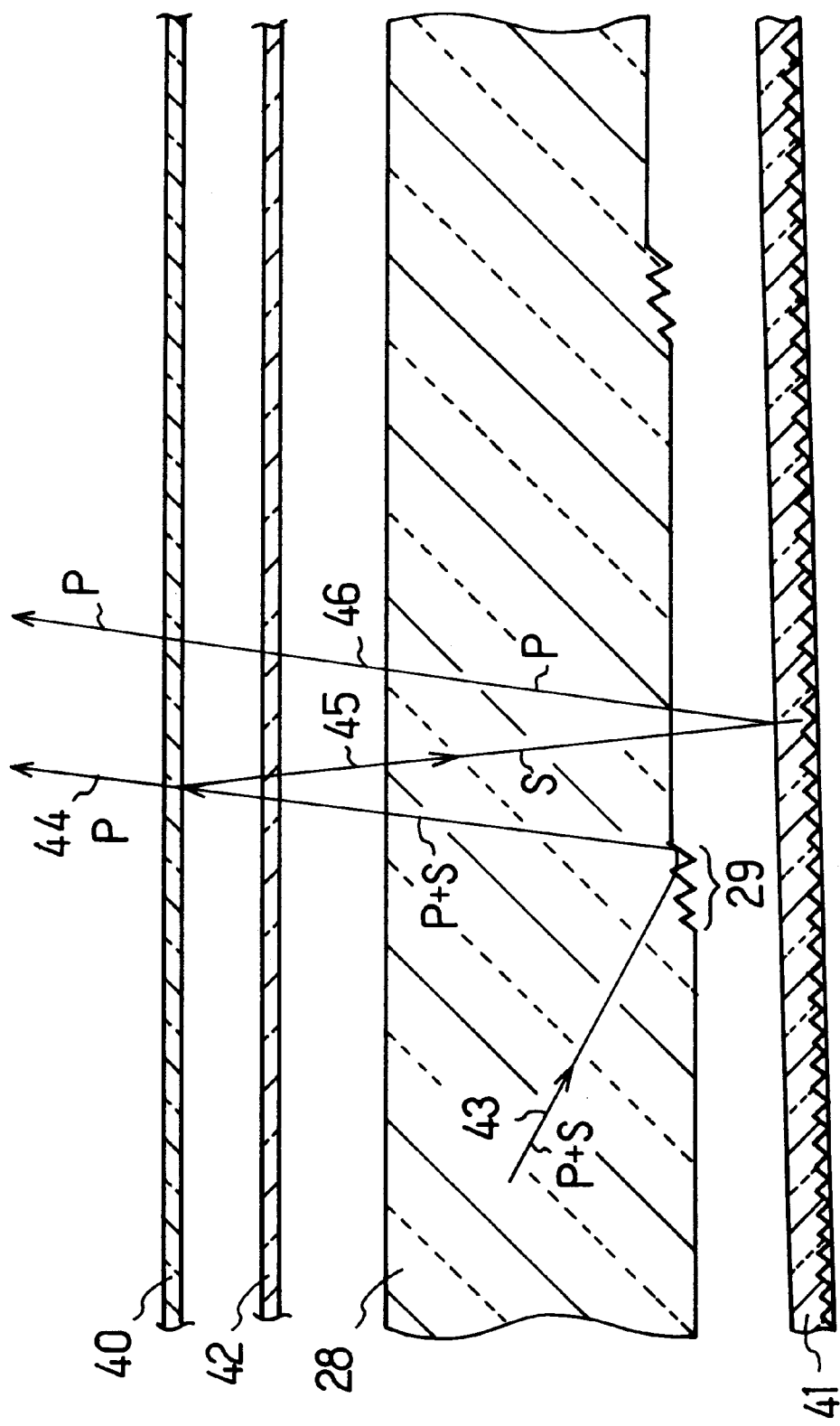
FIG. 28 shows an optical path track in relation to the panel-form illuminating system of the eleventh embodiment of the present invention.
Figure 29A:
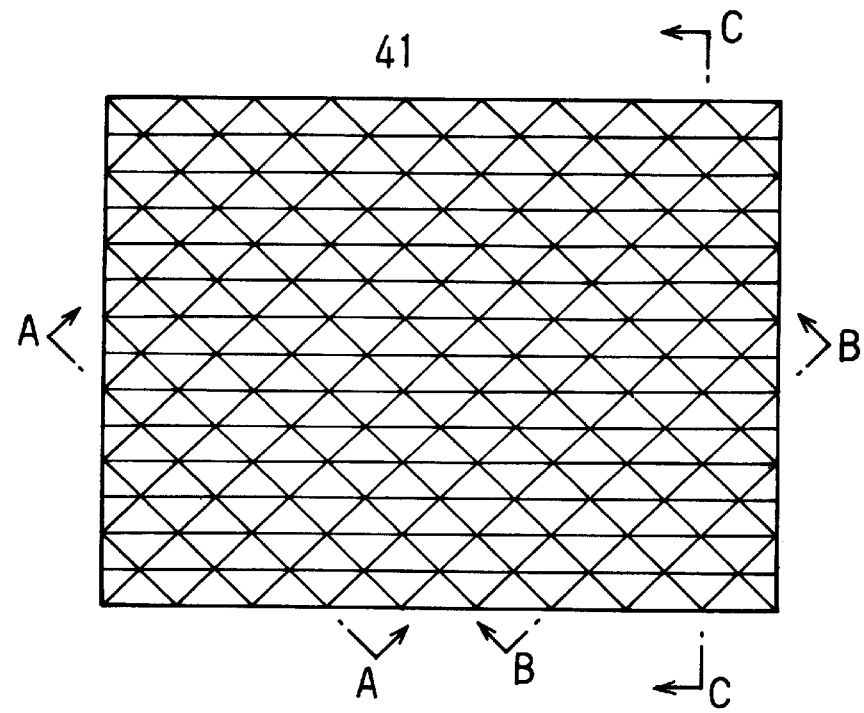
FIG. 29(a) is a plan view of a polarization converting plate of the panel-form illuminating system of the eleventh embodiment of the present invention.
Figure 29B:
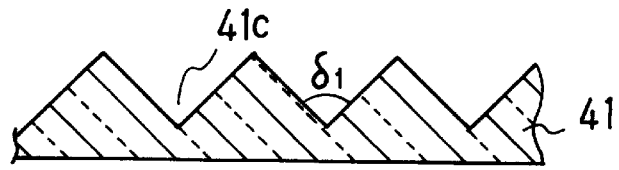
FIG. 29(b) is a cross-sectional view across line A—A shown in FIG. 29(a)
Figure 29C:
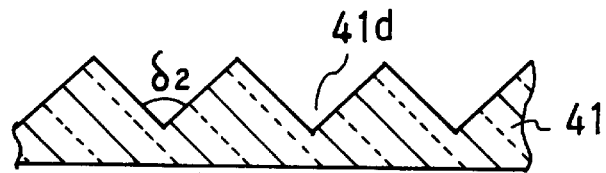
FIG. 29(c) is a cross-sectional view across line B—B shown in FIG. 29(a)
Figure 29D:
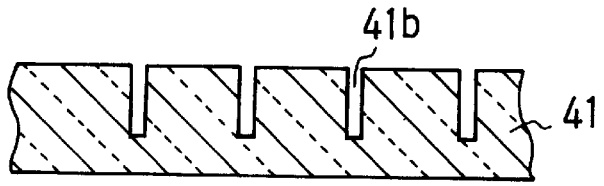
FIG. 29(d) is a cross-sectional view across line C—C shown in FIG. 29(a).

FIG. 27 is a cross-sectional view of a panel-form illuminating system of an eleventh embodiment of the present invention. FIG. 28 is an optical path track in relation to the panel-form illuminating system of the eleventh embodiment of the present invention. FIG. 29(a) is a plan view of a polarization converting plate; FIG. 29(b) is a cross-section across a line A—A shown in FIG. 29(a); FIG. 29(c) is a cross-section across a line B—B shown in FIG. 29(a); FIG. 29(d) is a cross-section across a line C—C shown in FIG. 29(a); and FIG. 30 explains polarization conversion.

As shown in FIG. 27, a light source 4, a reflector 5 and a photoconductor 28 have the same structure as in the third example, so that the explanation is omitted here. Above photoconductor 28, a light diffusing plate 42 is placed. Therefore, the light emitting from the top surface of photoconductor 28 can be diffused while maintaining its polarization state. In other words, when linearly polarized light enters light diffusing plate 42, the light is diffused and emits as linearly polarized light. The polarization direction of the diffused light is almost parallel to the incident light to the diffusing plate. Above light diffusing plate 42, a polarizer 40 is applied so as to transmit polarized light only in a particular direction and to reflect polarized light which is orthogonal to the polarization direction of transmitting light. Polarizer 40 is positioned so as to set its transmission axis in parallel to the transmission axis of the polarizer of a liquid crystal display on the side of incidence. Below photoconductor 28, a polarization converting plate 41 is applied. Polarization converting plate 41 rotates the polarization direction of linearly polarized light by almost 90° and emits the light in the opposite direction to the direction of incidence when the light hits the plate in a particular polarization direction.

The structure of polarization converting plate 41 is explained by referring to FIG. 29. As shown in FIGS. 29(a) and (d), a plurality of slit grooves 41b are formed in the longitudinal direction of polarization converting plate 41. As shown in FIGS. 29(a), (b) and (c), on polarization converting plate 41, a plurality of V grooves 41c and 41d are formed in an orthogonal direction to slit grooves 41b (the angle of V grooves relative to the slit grooves is about 45°) The depth of slit grooves 41b is almost the same as that of V grooves 41c and 41d. Polarization converting plate 41 is placed so that its grooved surface is facing down. A reflective film 41a is formed on the surface of grooves by depositing a material with a high reflectance such as silver or aluminum.

Figure 30:
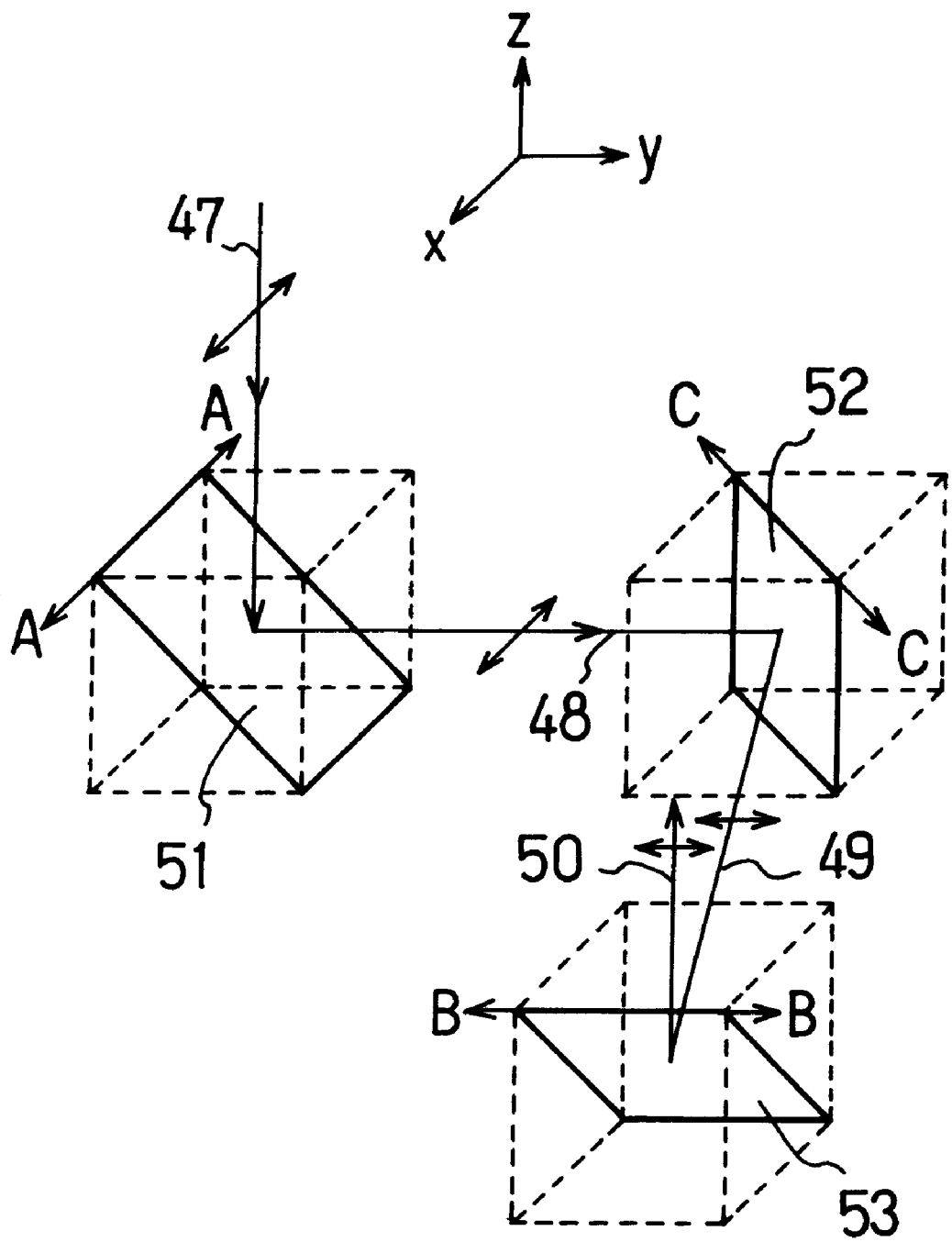
FIG. 30 explains the polarization conversion of the panel-form illuminating system of the eleventh embodiment of the present invention.

The operations of the panel-form illuminating system are explained by referring to FIGS. 28 and 30.

In FIG. 28, a transmitting ray 43 emits from the top surface of photoconductor 28 due to the total reflection at a groove 29 formed on the bottom surface of photoconductor 28. In general, incident light from linear light source 4 is randomly polarized light, and the light emitting from photoconductor 28 is also randomly polarized light. Among the rays reaching a polarizer 40, polarized light 44 in the transmission axis direction of polarizer 40 transmits through polarizer 40, and polarized light 45 which is orthogonal to polarized light 44 is reflected by polarizer 40. Polarized light 45 reflected by polarizer 40 transmits through photoconductor 28, and reaches polarization converting plate 41.

FIG. 30 explains the rotation of polarization direction by polarization converting plate 41. FIG. 30 shows three surfaces formed by three grooves 41b, 41c and 41d of polarization converting plate 41. In FIG. 30, a ray 47 is incident light to polarization converting plate 41, and is linearly polarized light having a polarization direction parallel to the x axis direction. Ray 47 is reflected by a surface 51, thus becoming a ray 48. Ray 48 also has a polarization direction parallel to the x axis. Ray 48 is reflected by a surface 52, thus becoming a ray 49 which has a polarization direction parallel to the y axis. Furthermore, ray 49 is reflected by a surface 53, thereby becoming a ray 50. Ray 50 has a polarization direction parallel to the y axis. In other words, the polarization direction of ray 50 is rotated by 90° relative to the polarization direction of ray 47. In the above explanation, the polarization direction of ray 47 is parallel to the x axis, but ray 47 can always be rotated by 90° regardless of its polarization direction (the direction may be either the x or y axis). Since polarization converting plate 41 can rotate a polarization direction by 90°, the polarization direction of ray 46, as shown in FIG. 28, is made parallel to the transmission axis of polarizer 40 by polarization converting plate 41. Ray 46 then transmits through polarizer 40.

As described above, in this example, by applying polarization converting plate 41, light absorption at the polarizer of a liquid crystal display on the side of incidence can be prevented, thus almost doubling optical efficiency. In other words, luminance and energy-saving properties are improved to a great extent.

EXAMPLE 12

Figure 31A:
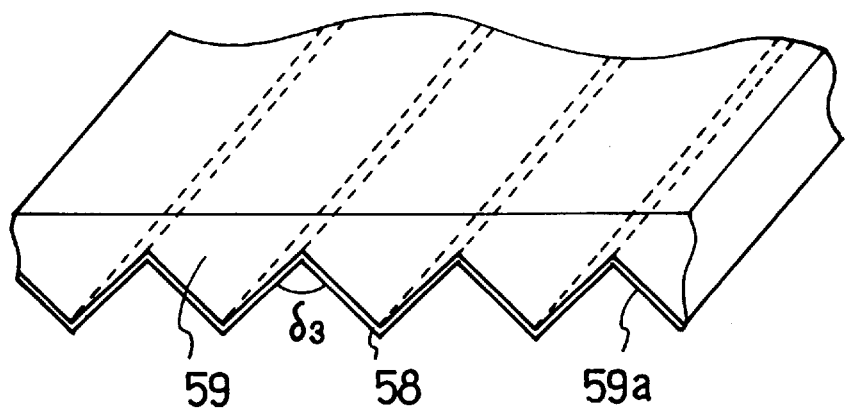
FIG. 31(a) is a partial perspective view of a polarization converting plate of a panel-form illuminating system of a twelfth embodiment of the present invention.
Figure 31B:
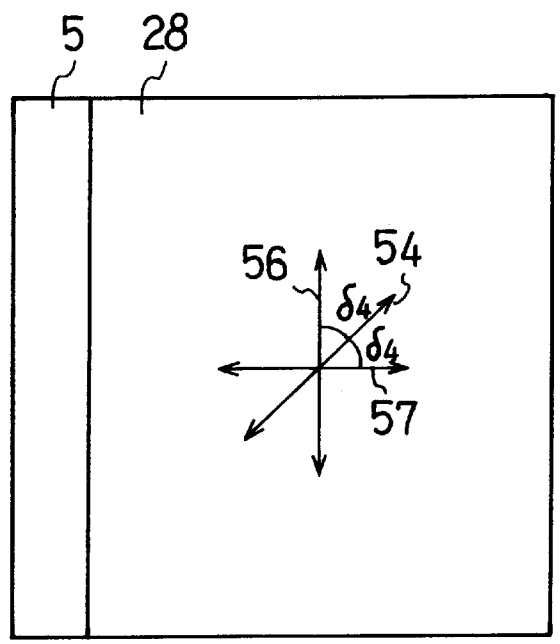
FIG. 31(b) shows a correlation between the transmission axis of a polarizer and the groove direction of the polarization converting plate of the twelfth embodiment of the present invention.
Figure 32A:
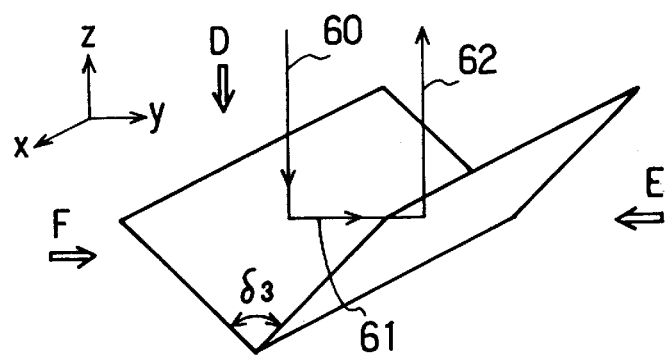
FIGS. 32(a) and (b) explain polarization conversion by the polarization converting plate of the panel-form illuminating system of the eleventh embodiment.
Figure 32B:
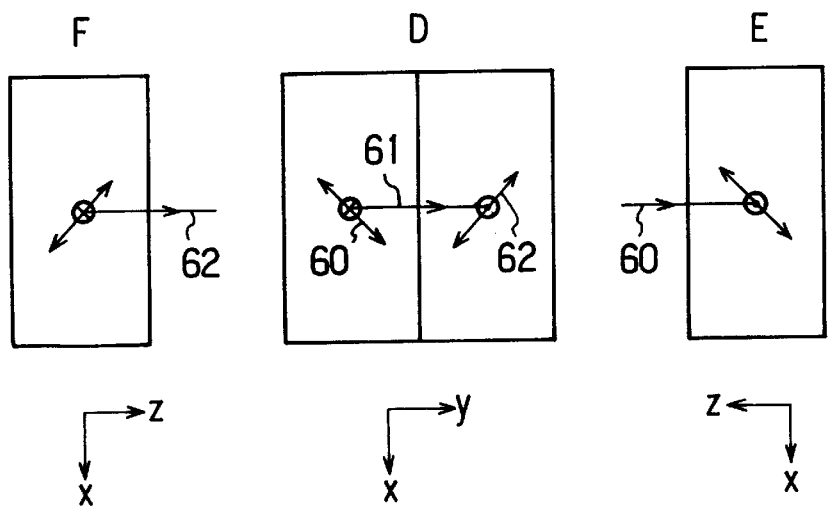

FIG. 31(a) is a partial perspective view of a polarization converting plate of a panel-form illuminating system of a twelfth example of the present invention. FIG. 31(b) shows a correlation between the transmission axis of a polarizer and the groove direction of the polarization converting plate. FIGS. 32(a) and 32(b) explain polarization conversion at the polarization converting plate. The panel-form illuminating system of this example has the same structure as in Example 11, except for the structure of the polarization converting plate.

As shown in FIG. 31(a), a plurality of grooves 59a having a triangular cross-section and an about 90° apex angle ($\delta_3$) is continuously formed on polarization converting plate 59. By depositing a material of a high reflectance such as silver or aluminum on the surface formed with grooves, polarization converting plate 59 is formed with a reflective film 58. Polarization converting plate 59 is placed so that its grooved surface is facing down (see 41 in FIG. 28). An angle ($\delta_4$) between the groove direction of polarization converting plate 59 and the transmission axis direction of polarizer 40 (shown in FIG. 27) is about 45°. As shown in FIG. 31(b), if the transmission axis direction of polarizer 40 is indicated as 54, the direction of groove 59a is either 57 or 56.

The rotation of polarization direction by 90° with polarization converting plate 59 will be explained by referring to FIG. 32. FIG. 32(a) shows a groove formed on the polarization converting plate. FIG. 32(b) shows FIG. 32(a) seen from D, E and F directions. In FIG. 32(b) D, an angle between the polarization direction of a ray 60 (which is irradiated to an inclined surface of a groove 59a) and the x axis is 45°. Ray 60 is reflected by the inclined surface, thus becoming a ray 61. In FIG. 32(b) E, the polarization direction of ray 61 on the xz surface is at an angle of 45° relative to the x axis. The F direction is opposite the E direction, so that the polarization direction of ray 61 appears as if it is rotated by 90° in FIG. 32(b) F compared with FIG. 32(b) E. Ray 61 is reflected by the other inclined surface of the groove, thus becoming a ray 62. According to FIG. 32(b) D, the polarization direction of ray 62 is rotated by 90° from the direction of ray 60. In other words, by polarization converting plate 59, the polarization direction is rotated by 90°.

As described above, in this example, polarization converting plate 59 formed with triangular grooves 59a of 90° apex angle ($\delta_3$) is placed so as to set the direction of grooves 59a at an angle of about 45° relative to the transmission axis direction of polarizer 40. Therefore, the rotation of the polarization direction becomes possible, and the same effects as in Example 11 are also found in this example.

EXAMPLE 13

Figure 33A:
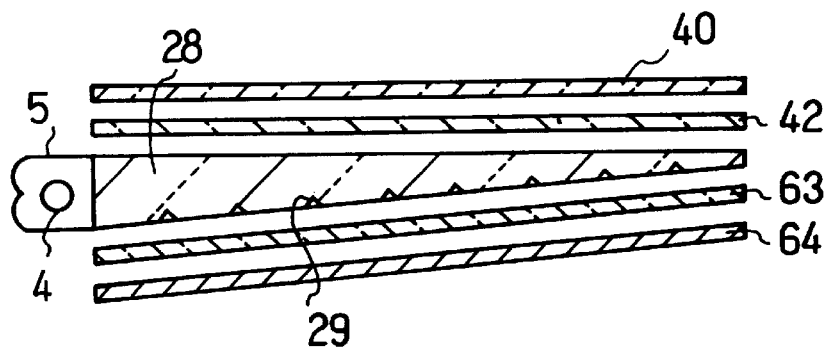
FIG. 33(a) is a cross-sectional view of a panel-form illuminating system of a thirteenth embodiment of the present invention.
Figure 33B:
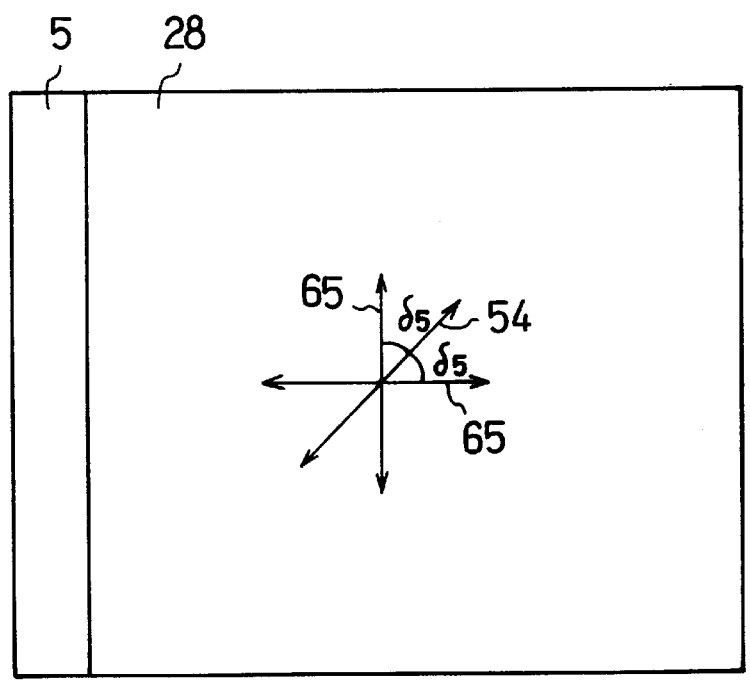
FIG. 33(b) shows a correlation between the transmission direction of a polarizer and the optical axis of a phase-contrast plate of the thirteenth embodiment of the present invention.
Figure 34:
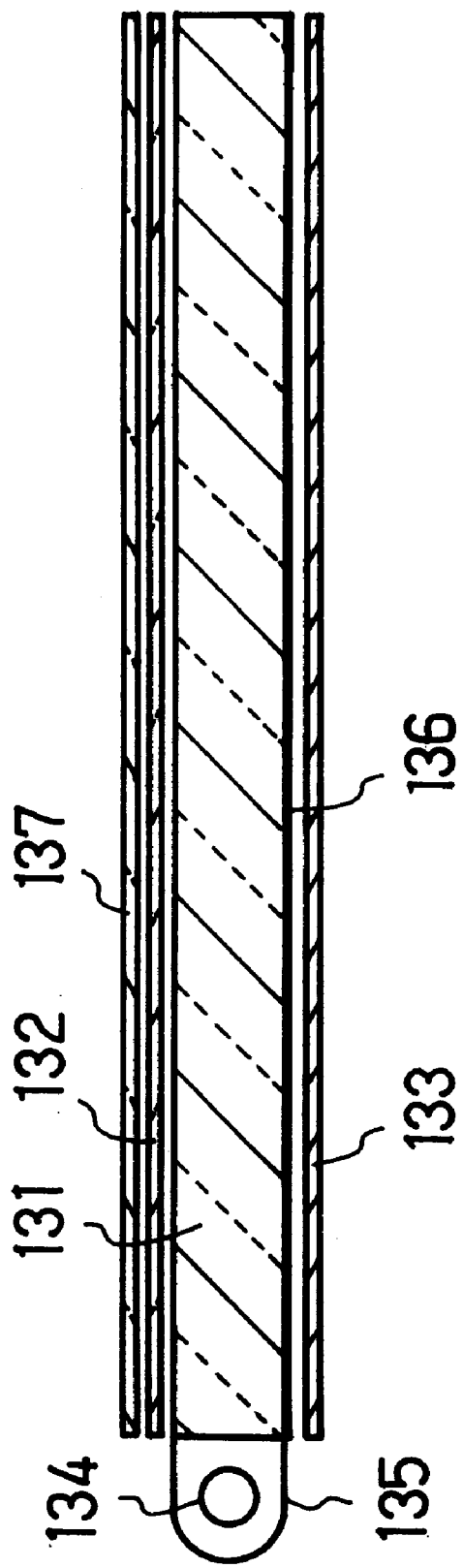
FIG. 34 is a cross-sectional view of a conventional panel-form illuminating system.

FIG. 33(a) is a cross-sectional view of a panel-form illuminating system of a thirteenth embodiment of the present invention. FIG. 33(b) shows a correlation between the transmission axis direction of a polarizer and the optical axis of a phase-contrast plate. The panel-form illuminating system of this example has the same structure as in Example 11, except that a phase-contrast plate 63 and a reflective plate 64 are applied instead of a polarization converting plate 41.

Phase-contrast plate 63 is a plate having optically uniaxial double refraction. For example, crystal, calcite or a transparent resin sheet which is extended to add double refraction properties can be used. The phase difference of phase-contrast plate 63 is set so as to deviate by a quarter wavelength from perpendicular incident light. As the material of phase-contrast plate 63, it is preferable to use a material having a large wavelength dispersibility, thus providing a constant phase difference within the wavelength of linear light source 4. Phase-contrast plate 63 is placed so as to set its optical axis at an angle of 45° relative to the transmission axis of polarizer 40. For instance, if the transmission axis direction of polarizer 40 is indicated as 54 in FIG. 33(b), the optical axis of phase-contrast plate 63 is in the direction of 65 or 66. An angle ($\delta_5$) between direction 54 and direction 65 or 66 is 45°.

When light (linearly polarized light)—having the angle of 45° relative to the optical axis of phase-contrast plate 63 enters the phase-contrast plate, the light becomes circularly polarized light. The circularly polarized light is reflected by reflective plate 64, and then becomes linearly polarized light again after reentering phase-contrast plate 63. Thus, the polarization direction of the linearly polarized light deviates by 90° relative to the original polarization direction of the incident light (linearly polarized light).

As described above, in this example, phase-contrast plate 63 having a quarter-wavelength phase difference is placed so as to set the direction of its optical axis at an angle of 45° relative to the transmission axis direction of polarizing plate 40. As a result, the same results as in Example 11 are obtained in this example.

Examples 11, 12 and 13 have the same structure as in Example 3. However, the structure is not limited to this, and may be have the structure of Examples 1 and 2 or from Examples 4 to 10.

In Examples 11, 12 and 13, the transmitted and reflected polarized light at polarizer 40 is linearly polarized light, but is not limited to this polarized light. It can also be elliptically polarized light.

In Examples 11, 12 and 13, linearly polarized light is rotated by 90° at the polarization converting plate, but elliptically polarized light can also be rotated in the same manner.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A panel-form illuminating system comprising a photoconductor and a light source positioned at a side of said photoconductor; said panel-form illuminating system emitting light from its top surface after the light is irradiated from said light source; said photoconductor comprising a plurality of grooves on its bottom surface spaced at a distance from each other; and each said groove comprising a plurality of adjoining smaller grooves, each of which has a light source-facing inclined surface.

2. The panel-form illuminating system according to claim 1, wherein the photoconductor has a wedge-shaped cross-section.

3. The panel-form illuminating system according to claim 1, wherein the groove has a width smaller than a gap between the grooves.

4. The panel-form illuminating system according to claim 1, wherein the groove has one of a trapezoidal and triangular cross-section.

5. The panel-form illuminating system according to claim 1, wherein the inclined surface has an angle expressed by the following formula:

$$\phi_1 = 53° - \sin^{-1}\{(1/n) \sin \alpha\}$$

where n represents an refractive index of the photoconductor; and $\alpha$ represents a central angle of a radiance distribution.

6. The panel-form illuminating system according to claim 1, wherein each groove comprises a plurality of adjoining smaller grooves.

7. The panel-form illuminating system according to claim 1, wherein the photoconductor comprises a tier-shaped bottom surface which comprises at least one groove at each level.

8. The panel-form illuminating system according to claim 1, wherein the inclined surface at least on a side facing said light source is a curved surface.

9. The panel-form illuminating system according to claim 1, wherein the inclined surface at least on a side facing said light source is a roughened surface.

10. The panel-form illuminating system according to claim 1, said panel-form illuminating system further comprising a polarizer above the photoconductor and a polarization converting plate below said photoconductor; said polarization converting plate rotating a polarization direction.

11. The panel-form illuminating system according to claim 10, wherein the polarization converting plate comprises grooves having a triangular cross-section and a 90° apex angle; said polarization converting plate being positioned so as to set a direction of said grooves at 45° relative to a transmission angle of the polarizer.

12. The panel-form illuminating system according to claim 1, said panel-form illuminating system further comprising a polarizer above the photoconductor and a phase-contrast plate having a quarter-wavelength phase difference below said photoconductor; and said phase-contrast plate being positioned so as to set an optical axis of said phase-contrast plate at 45° relative to a transmission axis of said polarizer.

13. The panel-form illuminating system according to claim 1, said panel-form illuminating system further comprising a light diffusion plate above the photoconductor and a reflective plate below said photoconductor.

* * * * *